US011465220B2

(12) United States Patent
Rose et al.

(10) Patent No.: US 11,465,220 B2
(45) Date of Patent: Oct. 11, 2022

(54) DRIVING SYSTEM FOR MACHINING TOOLS OR OTHER TOOLING USABLE WITH METAL-FABRICATING PRESSES OR OTHER MACHINES

(71) Applicant: Wilson Tool International Inc., White Bear Lake, MN (US)

(72) Inventors: Christopher J. Rose, Swindon (GB); Damian O'Brien-Jones, Swindon (GB); Jon M. Shimota, Stillwater, MN (US)

(73) Assignee: Wilson Tool International Inc., White Bear Lake, MN (US)

( * ) Notice: Subject to any disclaimer, the term of this patent is extended or adjusted under 35 U.S.C. 154(b) by 0 days.

(21) Appl. No.: 16/589,134

(22) Filed: Sep. 30, 2019

(65) Prior Publication Data
US 2020/0101546 A1    Apr. 2, 2020

Related U.S. Application Data

(60) Provisional application No. 62/739,339, filed on Sep. 30, 2018.

(51) Int. Cl.
*B23G 1/48*    (2006.01)
(52) U.S. Cl.
CPC ..................... *B23G 1/48* (2013.01)
(58) Field of Classification Search
CPC .................. B23G 3/005; B23G 1/48
See application file for complete search history.

(56) References Cited

U.S. PATENT DOCUMENTS

| | | |
|---|---|---|
| 1,381,197 A | 6/1921 | John |
| 1,700,980 A | 2/1929 | Galloway |
| 2,287,192 A | 6/1942 | Mueller |
| 2,615,183 A | 10/1952 | Johnson et al. |
| 2,715,233 A | 8/1955 | Clark |
| 3,075,398 A | 1/1963 | Bristol |

(Continued)

FOREIGN PATENT DOCUMENTS

| | | |
|---|---|---|
| CN | 207138657 U | 3/2018 |
| DE | 102014215951 A1 | 2/2016 |

(Continued)

OTHER PUBLICATIONS

Eitel, "Bodine's New Planetary PMDC Gearmotors Provide up to Twice the Torque," Retrieved online from https://www.motioncontroltips.com/bodines-new-planetary-pmdc-gearmotors-double-torque/ on Jan. 3, 2020, dated Nov. 13, 2017, 9 pages.

(Continued)

*Primary Examiner* — Alan Snyder
(74) *Attorney, Agent, or Firm* — Fredrikson & Byron, P.A.

(57) ABSTRACT

Driving systems for tools used with metal-fabricating presses or other machines, whereby planetary gears are used in the systems, and whereby the driving systems can be constructed for use with particular tooling, such as tapping tools, and complementary systems can be exemplarily configured for use with such driving systems. The driving systems can enable enhanced tool output as compared to conventional driving mechanisms, while also enabling variable disassembly and configuration of the systems relative to the intended machining operations.

30 Claims, 23 Drawing Sheets

(56) References Cited

U.S. PATENT DOCUMENTS

| | | | |
|---|---|---|---|
| 3,144,783 A | 8/1964 | Dubendorfer | |
| 3,193,859 A | 7/1965 | Pfister | |
| 3,397,588 A | 8/1968 | Johnson | |
| 3,579,687 A | 5/1971 | Hoshi et al. | |
| 3,717,892 A | 2/1973 | Johnson | |
| 3,838,934 A | 10/1974 | Petroff | |
| 3,871,498 A | 3/1975 | Kitaguchi | |
| 3,998,565 A | 12/1976 | Tanaka | |
| 4,014,421 A | 3/1977 | Johnson | |
| 4,123,192 A | 10/1978 | Ruland | |
| 4,692,072 A | 9/1987 | Pfister | |
| 4,700,441 A | 10/1987 | Ikeda et al. | |
| 4,706,369 A * | 11/1987 | Lavorel | B23G 3/005 29/560 |
| 4,757,598 A | 7/1988 | Redman | |
| 5,001,827 A | 3/1991 | Nakagawa | |
| 5,016,335 A | 5/1991 | Becker et al. | |
| 5,096,343 A | 3/1992 | Luu | |
| 5,173,015 A | 12/1992 | Maynard | |
| 5,310,292 A | 5/1994 | Mogilnicki et al. | |
| 5,348,429 A | 9/1994 | Pfister | |
| 5,603,590 A | 2/1997 | Wozar | |
| 6,547,496 B2 | 4/2003 | Chun et al. | |
| 7,559,727 B2 | 7/2009 | Kouno et al. | |
| 2003/0021646 A1* | 1/2003 | Chun | B23G 3/005 408/124 |
| 2009/0010727 A1 | 1/2009 | Ferry et al. | |
| 2011/0211925 A1 | 9/2011 | Liebald | |
| 2013/0047808 A1 | 2/2013 | Windingstad | |

FOREIGN PATENT DOCUMENTS

| | | |
|---|---|---|
| EP | 0666134 A1 | 8/1995 |
| FR | 1444213 A | 7/1966 |
| FR | 2688435 A1 | 9/1993 |
| JP | 06218625 A | 8/1994 |
| JP | 07185975 A | 7/1995 |
| JP | 2017001045 A | 1/2017 |

OTHER PUBLICATIONS

Glueck, "Advantages and Disadvantages of Planetary Gearmotors," Retrieved online from https://gearmotorblog.wordpress.com/2013/05/07/planetary-gearmotors/ on Jan. 3, 2020, dated May 7, 2013, 3 pages.

Gluek, "New Planetary PMDC Gearmotors Provide Up to Twice the Torque," Retrieved online from https://www.bodine-electric.com/blog/new-planetary-pmdc-gearmotors/ on Jan. 3, 2020, dated Nov. 8, 2017, 5 pages.

Kaim, "The World of Planetary Gears," Mar. 1, 2000, 7 pages.

Carvill, J., "The Student Engineer's Companion," Dec. 31, 1980, Butterworth & Co Ltd., XP002796760, 5 pages.

PCT Invitation, Partial International Search Report and Written Opinion dated Jan. 18, 2020, from related Intl. App No. PCT/US2019/053919, 17 pages.

International Patent Application No. PCT/US2019/053919, International Search Report and Written Opinion dated May 12, 2020, 25 pages.

* cited by examiner

DRIVING SYSTEM FOR MACHINING TOOLS OR OTHER TOOLING USABLE WITH METAL-FABRICATING PRESSES OR OTHER MACHINES

RELATED APPLICATIONS

The present application claims priority to U.S. Provisional Patent Application No. 62/739,339, filed Sep. 30, 2018, the teachings of which are incorporated herein by reference.

FIELD OF THE INVENTION

The present invention relates generally to metal-fabricating machines, and a driving system used therewith for tooling therefor, as well as other systems usable with the driving system.

BACKGROUND

Sheet metal and other workpieces can be fabricated into a wide range of useful products. The fabrication (i.e., manufacturing) processes commonly employed involve bending, folding, and/or forming holes in the sheet metal and other workpieces. The equipment used for such processes involve many types, including turret presses and other industrial presses (such as single-station presses), Trumpf style machines and other rail type systems, press brakes, sheet feed systems, coil feed systems, and other types of fabrication equipment adapted for punching or pressing sheet materials.

Concerning turret presses, they are known to involve a rotatable upper table or "turret" that carries a plurality of tools (e.g., punches), and a rotatable lower table/turret adapted to carry, for example, a plurality of dies. When the upper and lower tables are rotated into a position where a particular male punch on the upper table is aligned with a particular female die on the lower table, a workpiece (e.g., a piece of sheet metal) between the two can be machined (punched, bent, etc.) by moving the punch downward into contact with the workpiece so that the punch deforms the workpiece. The downward movement of the punch is caused when a ram strikes an upper part thereof. The die commonly has a recess into which the tip of the punch projects during the punching operation. In some cases, a hole is punched in the workpiece during the down stroke of the punch, whereby the tip of the punch may shear through the sheet metal (and in the process, extend into the die's central recess). By way of comparison, single station punches do not have a turret, but rather a single station adapted for pressing workpieces.

As is known, in some cases, metal-fabricating presses can be designed for use with tooling that needs to be rotated relative to their use in machining, such as with tapping tools. For example, tapping tools (and contrary to punch tools) are intended to create screw threads in a workpiece. Accordingly, the tapping tool (or "tap") is used to cut or form a female portion of the mating pair (e.g., characteristic of a nut). To that end, with the use of taps (and again contrary to use of punch tools), there is required radial or rotary motion of the tap as it is being linearly driven toward the workpiece (via down stroke of the press ram). Conversely, regarding use of a die with such tap, the die would primarily serve as a support for the sheet metal during the tapping process.

Continuing with focus on conventional tapping tools, there have been challenges encountered in using such tools with presses. For example, the ram stroke distance for presses can be limited. As such, output generated for the tapping tool, e.g., rotation quantity, can be correspondingly limited. Further, with conventional tool (driving) assemblies, the taps can be subjected to significant amounts of torque and shear stress from the rotational forces produced by the corresponding tapping mechanisms. To that end, the resulting rotational motions of components of the mechanisms act on the taps to correspondingly provide for rotation of the taps. As can be appreciated, over time, the torque and shear forces can result in the taps becoming deformed (or even shearing) along their extents during machining operations, depending on the workpiece material used and magnitude of forces generated by the mechanisms. What is more, for the magnitude of force generated to the tool for its machining operation, it has been difficult to transfer this force effectively to maximize output (rotation in the case of a tap), without correspondingly subjecting the tool to significant forces.

Over the years, there have been many designs to address the above-noted issues. For example, certain designs have used lead screws, which would rotate as a result of a ram's descent and correspondingly rotate the tap, with downward displacement of the tap being enabled via both the lead screw and tap having threaded linkage with a pitch assembly. Other designs have been known to involve electric means (motor) or even use auto-indexing functionality of the press.

However, while the above designs have been effective, there still remains a significant amount of force being transferred to tap, with limited amount of corresponding output, at least in terms of rotation. To that end, there remains a need for a tap-driving system that accounts for the above-described issues as well as others, and in so doing to provide both an effective and efficient system usable with metal-fabricating presses. However, in addressing such need, it was appreciated that such a solution would be further applicable and could be expanded to other tooling used with such presses and other machines, as well as potentially to other intended functions of the presses and machines.

SUMMARY OF THE INVENTION

Embodiments of the invention involve driving systems for tools used with metal-fabricating presses or other machines, whereby planetary gears are used in the systems. Some of the embodiments are concerned with driving systems being constructed for use with particular tooling, such as tapping tools. Further embodiments involve complementary systems exemplarily configured for use with such driving systems. Embodiments of the driving systems enable enhanced tool output as compared to conventional driving mechanisms. Some of the embodiments also enable variable disassembly and configuration of the driving systems relative to the intended machining operations.

BRIEF DESCRIPTION OF THE DRAWINGS

The following drawings are illustrative of particular embodiments of the present invention and therefore do not limit the scope of the invention. The drawings are not necessarily to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and other elements employ that which is known to those of ordinary skill in the field of the invention. Those skilled in the art will recognize that many of the noted examples have a variety of suitable alternatives.

Figure 1:
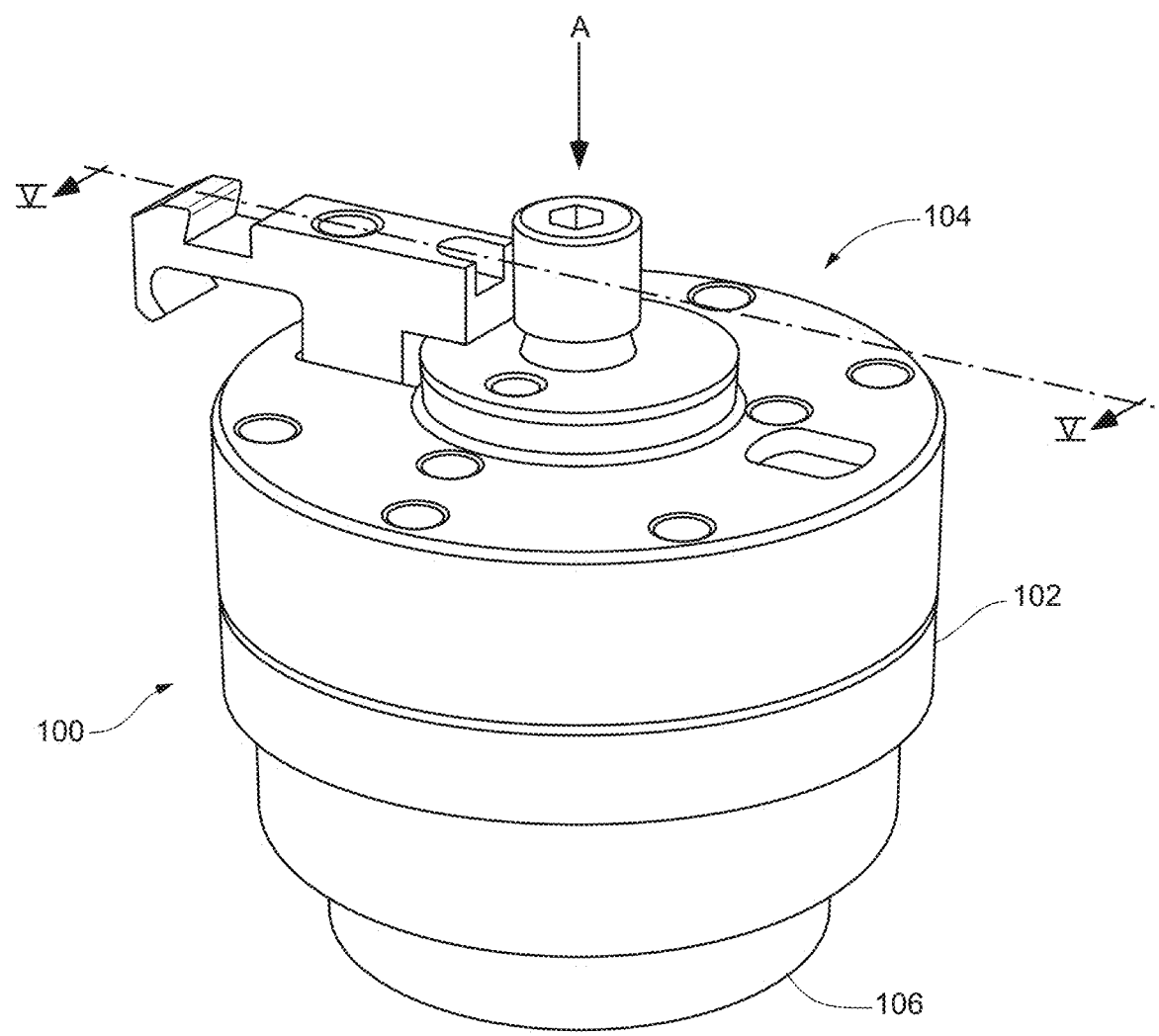
FIG. 1 is a perspective view of a driving unit, from a side vantage point, in accordance with certain embodiments of the invention.

FIG. 1 shows a perspective view of a driving unit 100 in accordance with certain embodiments of the invention, wherein the driving unit 100 is configured for driving a tool loaded therein. As will be further detailed herein, such tool could be a tapping tool ("tap") 101 (visibly shown, perhaps most clearly, in FIGS. 5 and 7). As shown, the driving unit 100 is relatively compact in form, via use of a general housing 102. To that end, in certain embodiments, the housing 102 is formed of a plurality of intercoupled layers, each of which is contained via separate outer housing structure, to hold the corresponding components of the unit 100. Given its compact form, the driving unit 100, in certain embodiments, can be adapted for use with any of a variety of metal-fabricating presses or other machines, whether new or existing, which warrant machining operations for which tools, when loaded within the driving unit 100, can provide. One such machine that would be predisposed for being retrofitted with the driving unit 100 would involve a turret press, whereby the unit 100 could be simply positioned therein (e.g., in a bore on the upper table thereof); however, in the case of presses, the unit's design could just as well be utilized with any variety of industrial press types, including single-station, Trumpf style machines and other rail type systems, press brakes, sheet feed systems, coil feed systems, as well as other types of fabrication equipment adapted for punching or pressing sheet materials.

Continuing with FIG. 1, the driving unit 100 is shown oriented similar to that when used within a metal-fabricating machine. For example, the upper portion 104 of the unit 100 is configured to be driven vertically downward (via driving force A, e.g., ram stroke), whereby the lower portion 106 of the unit 100 is correspondingly driven vertically downward to contact underlying structure, such as material 103 to be machined (e.g., sheet metal 103; see FIG. 7). As will be further detailed herein, the lower portion 106 is operably linked to the upper portion 104 so as to be vertically movable relative to the upper portion 104. As such, upon contacting the underlying structure, the lower portion 106 is driven vertically upward (again, relative to the upper portion 104) so as to internally trigger protrusion of the tool from the unit 100, while the tool is also simultaneously rotated by the unit 100 for its machining function. Thus, in certain embodiments, said lower portion 106 can be referred to as a driving portion of the unit 100 via its corresponding upward linear driving force relative to the upper portion 104. To that end (and as further detailed herein), the driving unit 100 is configured to function in transferring such linear force (e.g., originally derived from downward movement of the unit 100 onto the underlying structure, such as material to be machined) to rotational force (for rotating the tool loaded within the unit 100).

Figure 2:
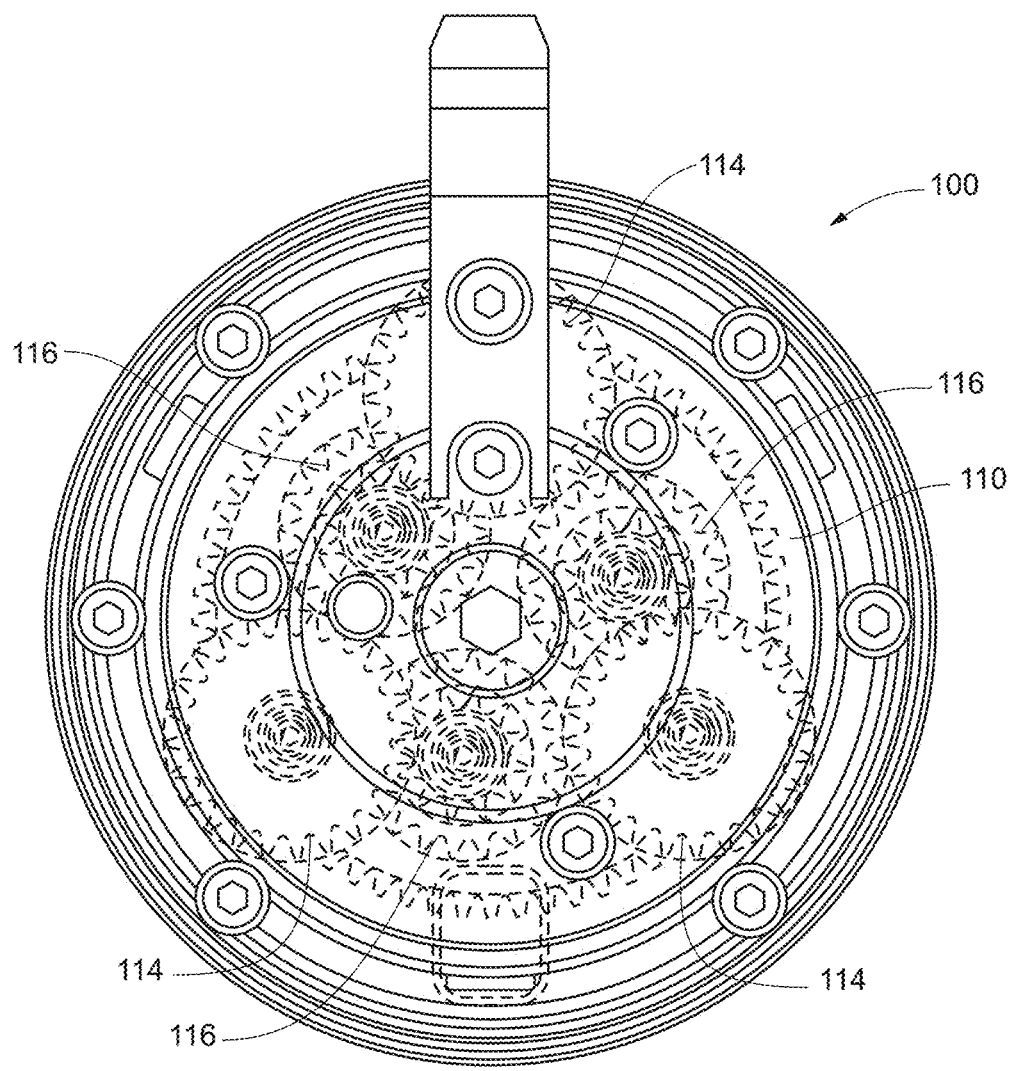
FIGS. 2 and 3 are internal views of the driving unit of FIG. 1, taken from top and side vantage points, respectively.

With focus now being directed to a particular tooling type that the driving unit 100 can be configured to exemplarily employ, taps, as described above, have conventionally been found to endure a tremendous amount of torque and shear stress from the rotational force that is imparted from tapping mechanisms. As further detailed herein, the rotational forces conventionally encountered by the tap with tapping mechanisms, can be distributed and balanced with the driving unit 100, so as to bolster the strength of assembly, lessening potential of adverse impact on the tap while increasing amount of corresponding output derived from the tool, at least in terms of its rotation. One manner of accomplishing this is via the use of interconnected sets (or stages) of gears within the driving unit 100 for transferring force to tools loaded therein. With reference to FIG. 2, showing an internal view of the unit 100, in certain embodiments, a gearing configuration, involving a plurality of gear sets, is situated in the upper portion of the unit 100 and used with regard to the transfer of forces to tool used therewith. To that end, in certain embodiments, the gearing configuration of interconnected gears forms planetary gearing for use in the driving unit 100. Accordingly, as further detailed herein, the planetary gearing of the driving unit 100 is generally configured for actuation following application of the driving force A and concurrent with use of the tool loaded within the unit 100.

Figure 3:
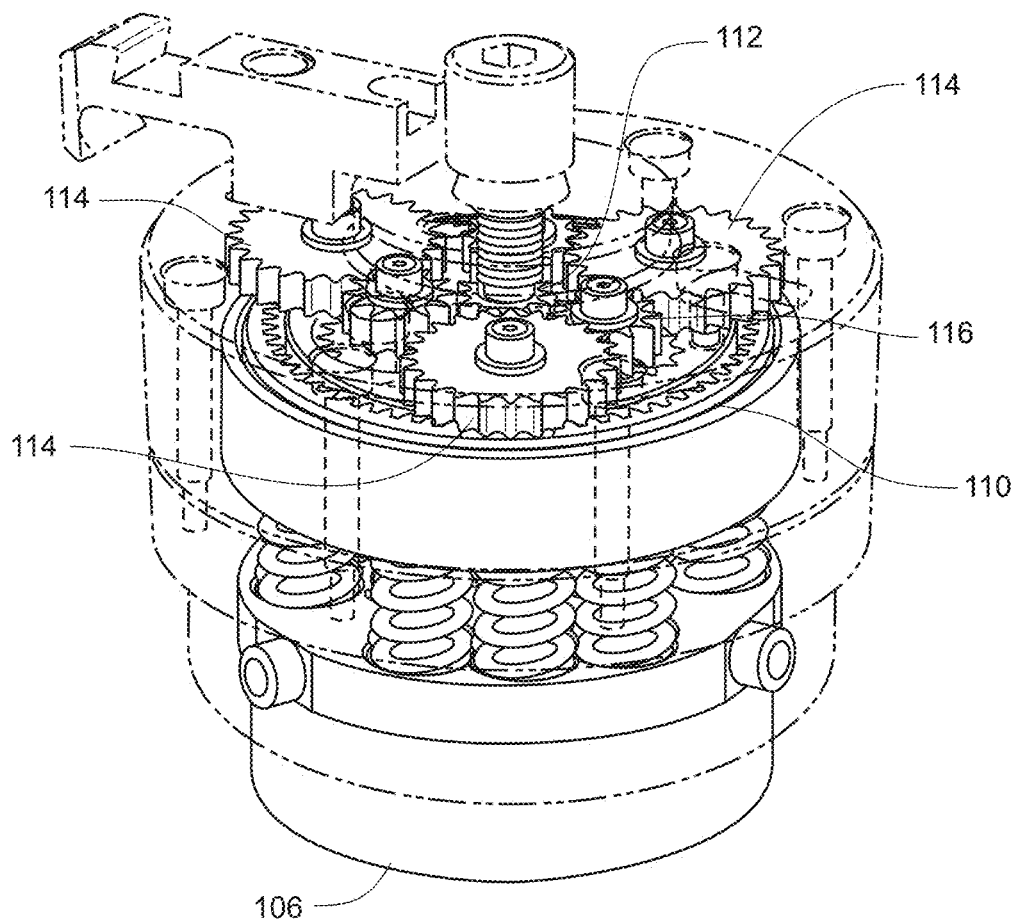

With further detail on general basics regarding planetary gearing set-ups, three sets of gears are typically required, each with different degrees of freedom. Particularly, at least three planet gears are configured to rotate around axes that revolve around a central sun gear, which spins in place, and a ring gear is used to bind the planet gears on the outside. Correspondingly, and turning back to the FIG. 2 (and with reference to FIGS. 3 and 4, as further detailed below), the ring gear is referenced as 110, while the sun gear is referenced as 112. To that end, between the ring gear 110 and the sun gear 112, two groupings of planet gears 114 and 116 are used. However, the invention should not be limited to such, as differing designs relative to the driving unit 100 could utilize one grouping as well as more than two groupings of planet gears. Particularly, an advantage of utilizing increased quantities of planet gear groupings involves corresponding increased rotations of the central sun gear 112; however, increased quantities would also necessitate greater housing capacity for the driving unit 100.

Figure 4:
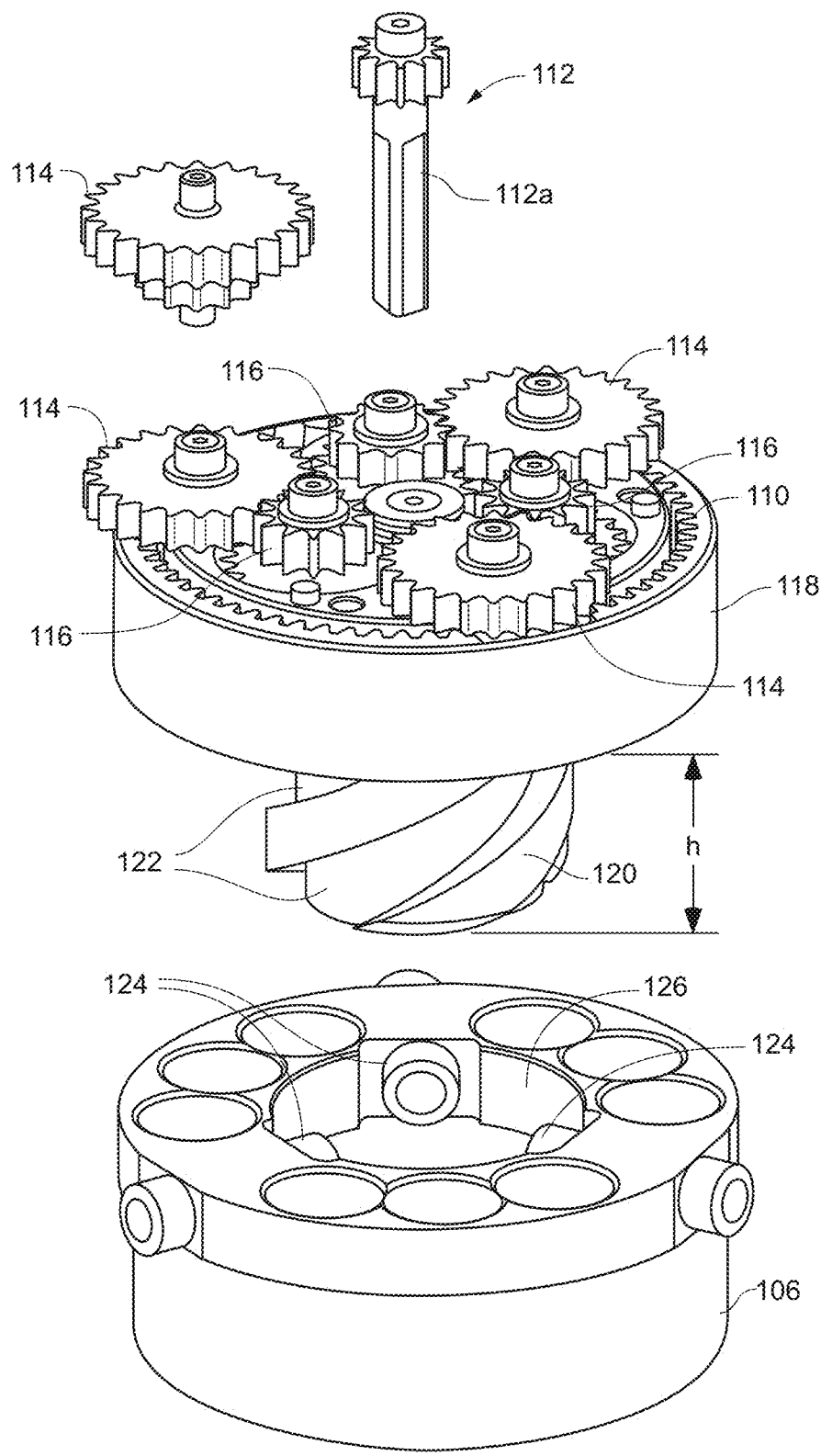
FIG. 4 is an exploded view of select components of the driving unit of FIG. 1.

In using such planetary gearing with the driving unit 100, reference is again made to FIG. 3, showing an internal view of the unit 100 taken from side vantage point, and FIG. 4, showing an exploded view of the unit 100 relative to select components thereof. To that end, the upward vertical linear motion of the unit's lower portion 106 correspondingly triggers rotation of the ring gear 110, which in turn drives the first set of planet gears 114, which in turn drives the second set of planet gears 116, which in turn drives the central sun gear 112. Relative to the ring gear 110, in certain embodiments, the gear 110 is operably secured to a helix drive 120. To that end, in certain embodiments as shown, the ring gear 110 is internally situated within a casing 118 extending from the helix drive 120, whereby the gear 110 (via its operable securement to the helix drive 120) is rotated as a result of the upward vertical linear motion of the unit's lower portion 106.

In certain embodiments, along the longitudinal extent h of the helix drive 120, a plurality of upwardly-curving channels 122 are defined, along which a corresponding plurality of bearings 124 are configured to move. In certain embodiments as shown, the bearings 124 are rigidly secured to, and protrude from, an inner recess 126 defined in the lower portion 106. To that end, the recess 126 is sized to receive the helix drive 120, such that the channels 122 receive the corresponding bearings 124. Given such assembly between the lower portion 106 and the helix drive 120, as the lower portion 106 is moved linearly upward (upon contacting underlying structure, e.g., the material to be machined), a corresponding upward linear force is exerted on the bearings 124. However, on account of the bearings 124 being rigidly secured to the lower portion 106 as well as the lower portion 106 generally being prevented from rotating via its contact with the underlying structure, the upward linear force on the bearings 124 causes their upward movement along the corresponding channels 122 of the helix drive 120. Although, given the lower portion 106 (and the bearings 124) being held stationary (so as to not rotate), the movement of the bearings 124 within the channels 122 in actuality involves the channels 122 sliding downward relative to the bearings 124 therein, and a corresponding rotation of the helix drive 120 relative to the lower portion 106 and its bearings 124. In certain embodiments, as shown, the bearings 124 are situated at equal distances from each other about the recess 126 of the lower portion 106. For example, in certain embodiments as shown, a quantity of three bearings 124 are employed with respect to the lower portion 106. To that end, in having these bearings 124 positioned at equal distances from each other, there is 120° separation of the bearings 124 about the lower portion 106. Based on securement of the ring gear 110 to the helix drive 120 (via linking of the casing 118 internally to the gear 110), rotation of the helix drive 120 results in corresponding rotation of the ring 110.

Shifting back to the planetary gearing used with the driving unit 100, as already noted, in moving from rotation of the ring gear 110, to corresponding rotation of the first set of planet gears 114, to corresponding rotation of the second set of planet gears 116, to rotation of the sun gear 112, the quantity of rotations of each successive gear relative to the planetary gearing increases. Such attribute of planetary gearing should be appreciated, as each successive gear (or set of gears) is situated further central to its preceding gear (or set of gears), such that the more centralized gears have greater corresponding quantity of rotations. To that end, with use of the exemplary gear set-up, a ⅓ turn or rotation of the ring gear 110 (corresponding to turn or rotation of the helix drive 120) corresponds to 7 turns or rotations of the sun gear 112.

Figure 8:
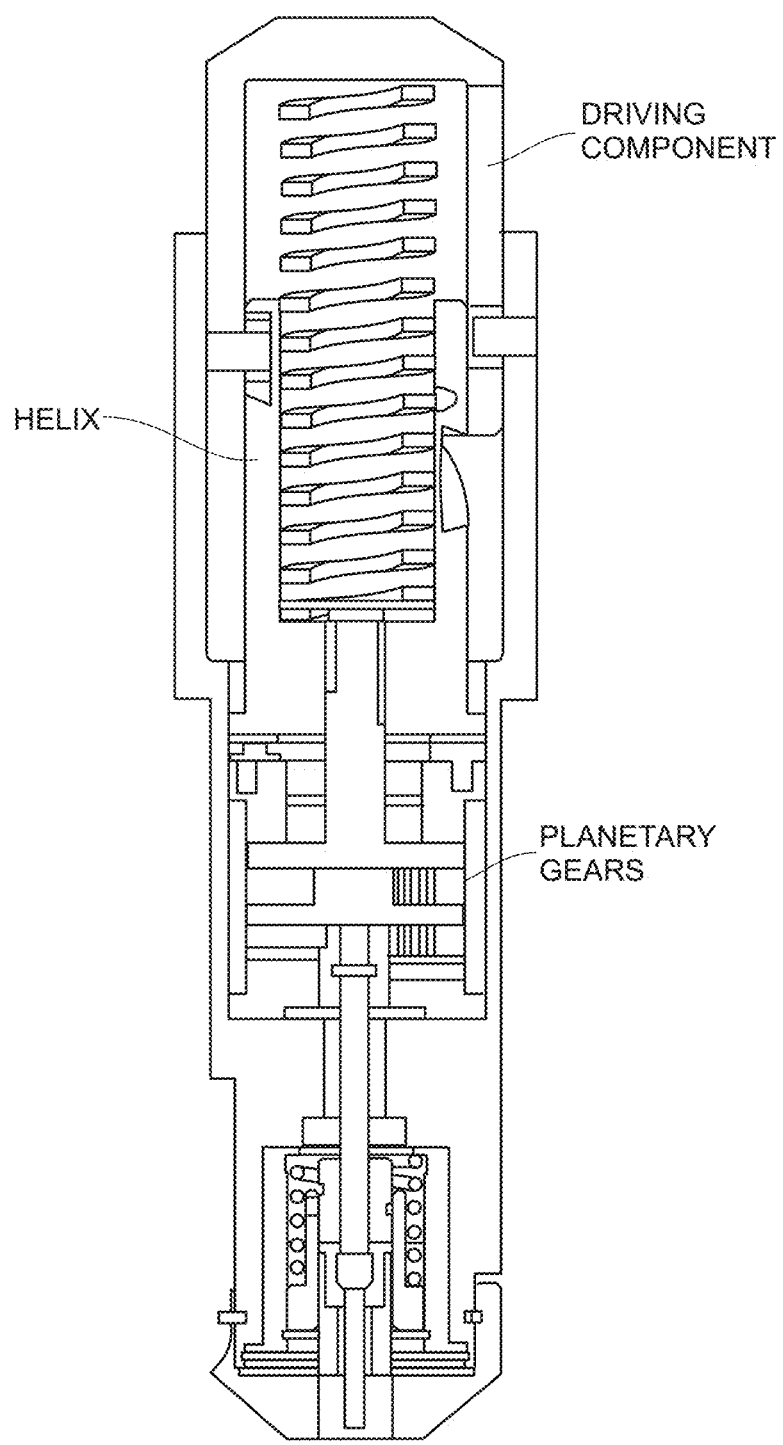
FIG. 8 shows a driving unit with alternate layout relative to corresponding components relative to its upper and lower portions in accordance with certain embodiments of the invention.

While the above description has focused on embodiments for the driving unit 100, in which the helix drive 120 lies below the gearing configuration, e.g., planetary gearing, for the unit 100, the invention should not be limited to such. For example, as shown in FIG. 8, the driving unit can have the exact opposite layout relative to the helix drive 120 and the gearing configuration, whereby the helix drive 120 is situated atop the gearing configuration. With the above embodiments serving as basis, the manner by which such further layout for driving unit operates would be understood. For example, upon downward vertical force impacting upper portion (surrounding stem of helix drive 120), the lower portion (containing the gearing configuration) would in turn be directed toward and contact the surface (material to be machined). In turn, the lower portion (with gearing configuration) would be directed vertically upward relative to the upper portion (surrounding stem of helix drive 120). In certain embodiments, a first part of the lower portion that retains the gearing configuration is rotatably held to a second part of the lower portion contacting the material to be machined. Further, the upper portion would be locked from rotation via one or more upper extensions protruding from the upper portion (e.g., the extensions being keys aligning with vertical slots of turret bore). To that end, upon upward vertical movement of the lower portion, the lower portion (gearing configuration) would be raised relative to the upper portion (helix drive 120), but based on the rotatable coupling between first part of the lower portion (machining material—contacting part) and second part of the lower portion (gear configuration) of the lower portion, and further the locking (from rotation) of the upper portion (surrounding stem of helix drive 120), the upward movement of the lower portion relative to the upper portion would result in the second part of the lower housing (gearing configuration) raising relative to upper portion, with the stem of the helix drive 120 configured to rotate about the fixed upper portion (via the bearings 124 of the upper portion moving downward in the curved channels 122 of the helix drive stem). To that end, such rotation of the helix drive 120 in turn correspondingly rotates the gears of the gearing configuration, as already described. One advantage of such an alternate layout for the driving unit would be the corresponding closer positioning of the gearing configuration to the tap, whereby the sun or output gear would not warrant as long of an extension, or even an insert 130, connecting said gear to the tool.

Figure 5:
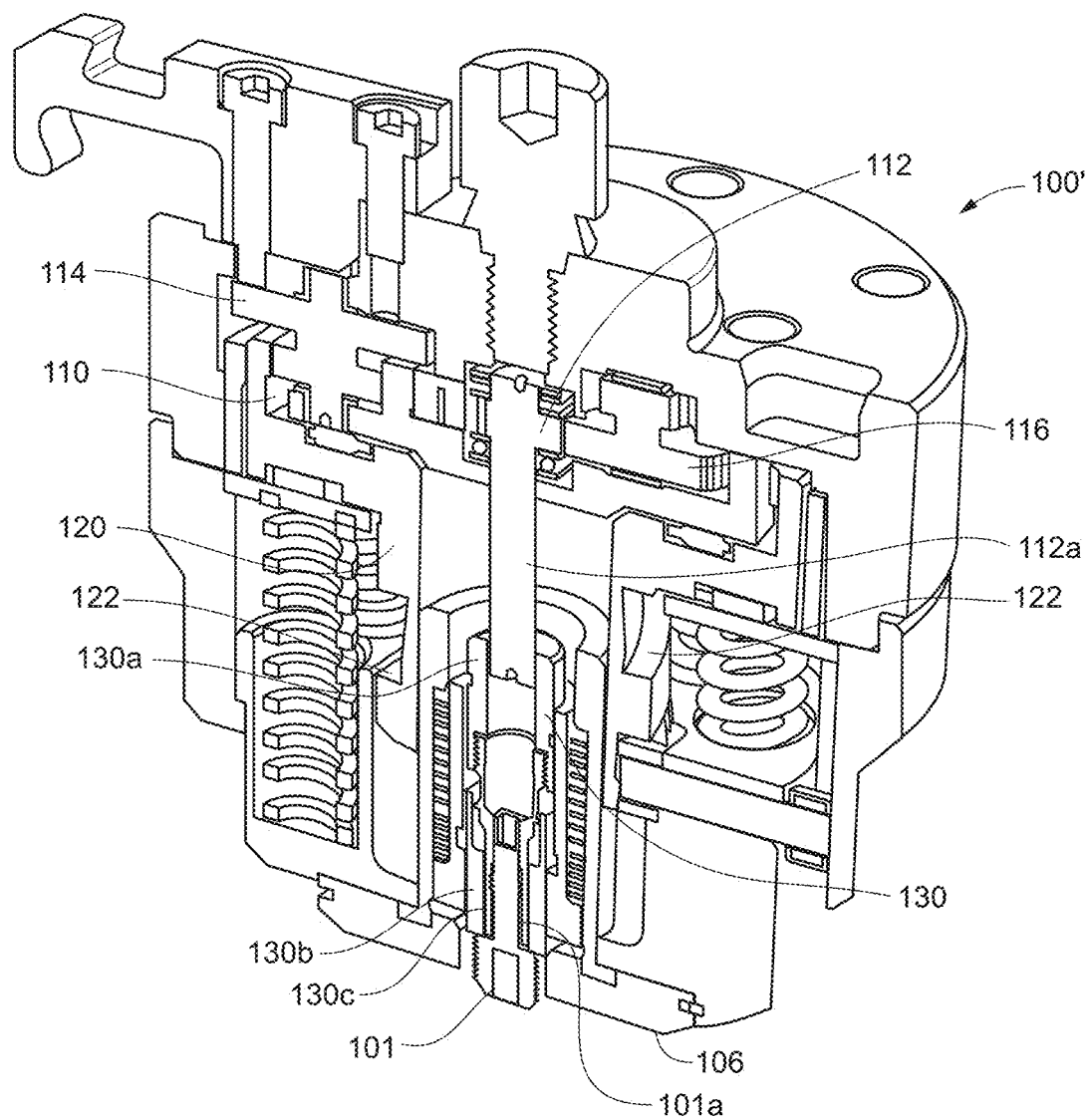
FIG. 5 is a perspective cross-sectional view of the driving unit of FIG. 1, taken along the line V-V, whereby the driving unit is configured for use and employs tapping tool in accordance with certain embodiments of the invention.

Turning to FIG. 5, it shows a perspective cross-sectional view of a driving unit 100' (similar to the driving unit 100, yet configured to employ a tapping tool ("tap") 101) in accordance with certain embodiments of the invention. As shown, the tapping tool or tap 101 is situated below and in line with the helix drive 120, which as described above rotates the gears of the gearing configuration. To that end, the driving unit 100' is configured for its sun gear 112 to be operatively linked to the tap 101. As such, the rotations of the sun gear 112 are similarly imparted to the tap 101. Thus, as exemplified above, given a quantity of 7 rotations of the sun gear 112, the tap 101 is found to rotate 7 times as well. To that end, the sun gear 112 is operably coupled to the tap 101. In certain embodiments, as shown, such operable coupling is provided via use of an insert 130, whereby one end 130a of the insert 130 is configured to link with an extension 112a of the sun gear 112. One exemplary linkage configuration can involve the insert 130, or at least its opposing ends 130a, 130b being hollowed. To that end, in certain embodiments (and as exemplarily shown in FIG. 4), the sun gear extension 112a can be defined to have a particular shape (e.g., square shape), with the insert end 130a being defined with corresponding internal shape (e.g., square profile), so as to snuggly receive the sun gear extension 112a. Accordingly, via such snug linkage, rotation of the sun gear 112 corresponds to same rotation of the insert 130. Likewise, in certain embodiments, the opposing end 130b of the insert 130 can be defined with corresponding internal shape (e.g., square profile), so as to snuggly receive correspondingly-shaped (e.g., square-shaped) end 101a of the tap 101. Although, in certain embodiments, one or more ball bearings 130c can be positioned within the insert end 130b so as to partially protrude from said square-shaped internal profile and contact (and more snugly retain) outer surfaces of square-shaped tap end 101a. Accordingly, via such linkage, rotation of the insert 130 corresponds to same rotation of the tap 101. Of course, there are a variety of manners by which linkage can be provided between (e.g., opposing ends of) the insert 130 and (e.g., corresponding ends of) the sun gear extension 112a and the tap 101, and while one such example is detailed, the invention should not be limited to such.

Figure 6:
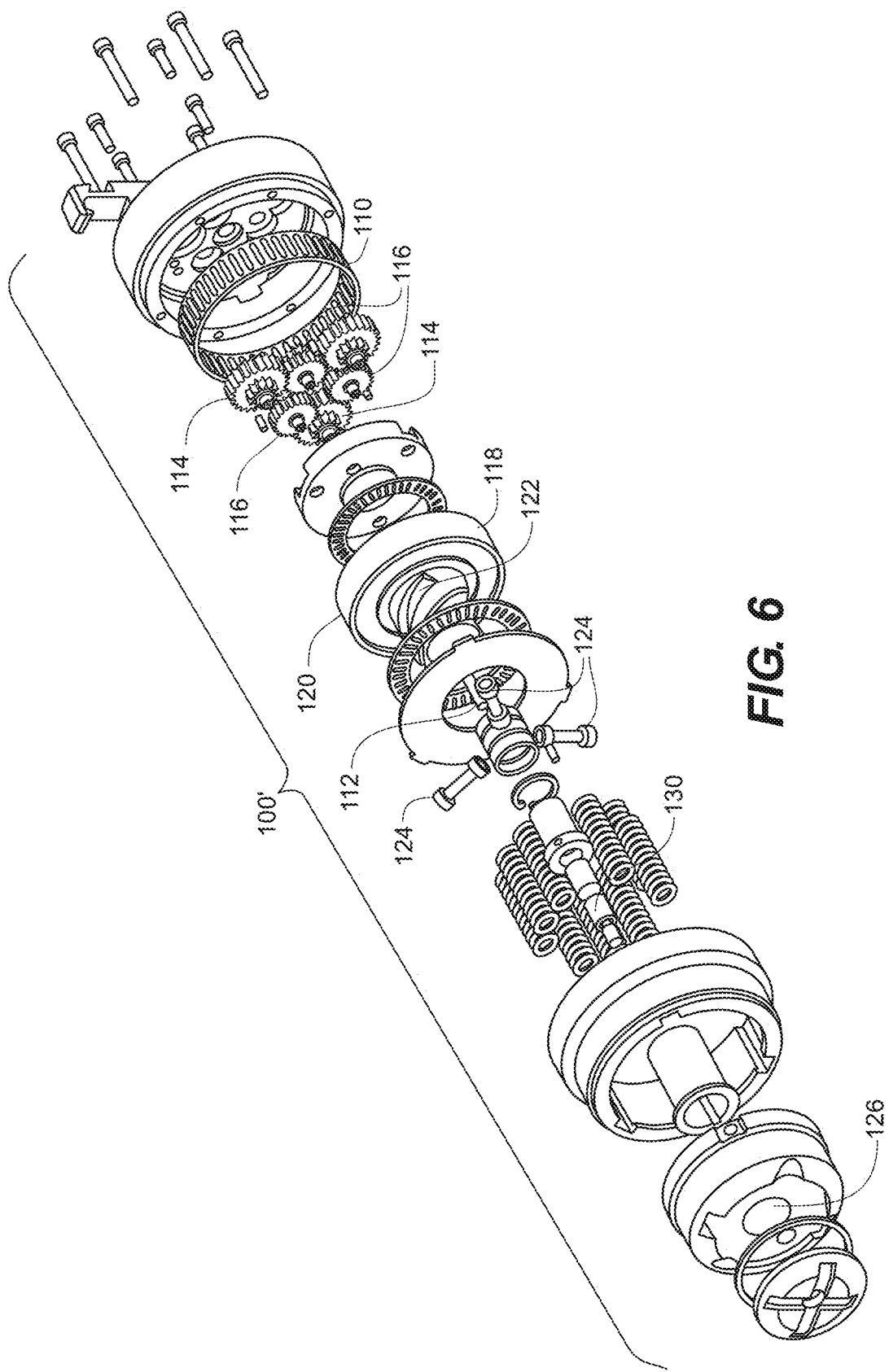
FIG. 6 is an exploded view of the driving unit of FIG. 5.
Figure 7:
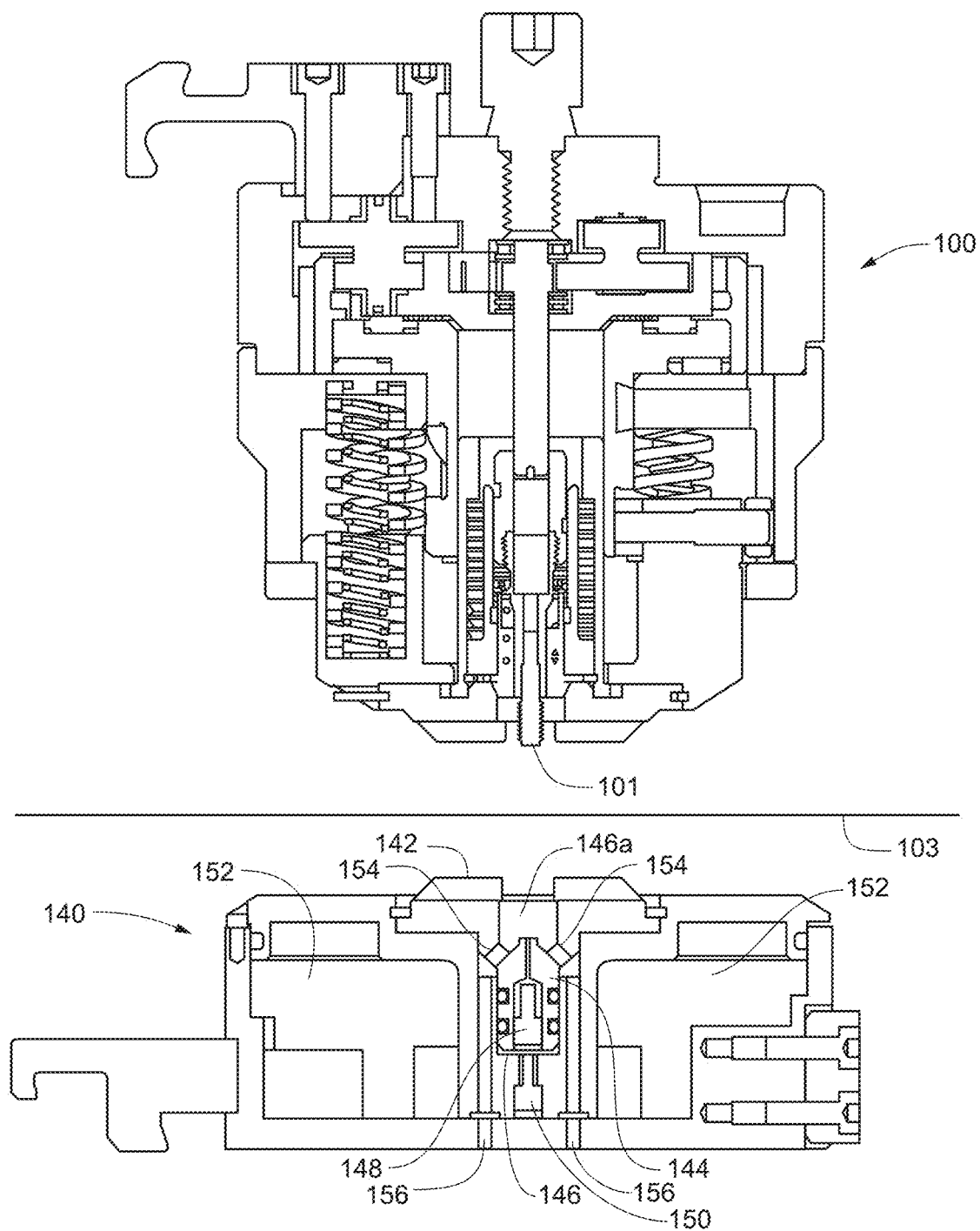
FIG. 7 shows elevation cross-sectional views of the driving unit of FIG. 5 and a die used therewith in accordance with certain embodiments of the invention, with cross section of the driving unit being same as shown in FIG. 5 and similarly taken relative to the die.

FIG. 6 illustrates a fully exploded view of the driving unit 100' less the tap 101 in accordance with certain embodiments of the invention. The driving unit 100' is shown from right to left relative to components and housing structure from the upper portion 104 to the lower portion 106' (denoted differently from previously-referenced lower portion 106 of FIGS. 1 and 3, as it includes the insert 130 for tap 101). To that end, such view provides clearer representation of the components and their compilation. Turning to FIG. 7, it shows elevation cross-sectional views of the driving unit 100' (similar to that shown in FIG. 5) and a die 140 used therewith, in accordance with certain embodiments of the invention. Shifting focus to the tap 101 of the driving unit 100', and specific to projection of the tap 101 from the unit 100' to perform tapping operation on corresponding material (e.g., sheet metal 103), due to the lower portion 106 moving vertical upward upon contact with the material, the tap 101 by comparison is not moved upward. Instead, by the upward movement of the lower portion 106, the tap 101 is essentially lowered relative to the material to contact and subsequently perform its tapping operation thereon, while the tap 101 is also rotated for such operation corresponding to the rotation of the sun gear 112.

Regarding the depicted die 140 of FIG. 7, it is configured to serve as a lubrication system for the tap 101 during its tapping operations. To that end, when the lower portion 106' of the driving unit 100' contacts the material (e.g., sheet metal 103), such also corresponds to further contact between the material and an upper surface of the die 140. In certain embodiments, such further contact triggers lubricant (e.g., oil) being upwardly directed from the die 140 toward corresponding overlaying portion of the material. In certain embodiments as shown, such die upper surface involves a vertically-protruding pad portion 142 of the die 140, whereby downward depression of the pad 142 (via contact from the material, e.g., sheet metal 103) results in triggering of a pump piston 144 positioned within the die 140 and below the pad 142 to force the lubricant from a tapping reservoir 146. To that end, in certain embodiments, the piston 144 acts upon a first valve 148 so as to permit lubricant to pass there through from the reservoir 146 and be directed at the area of the material being machined by the tap 101. In so doing, based on the lubricant being projected below the material as well as below the driving unit 100, the lubricant is found to cover material areas below and above, as well as area defined within, a pre-punched hole (prior to it being tapped via tap 101 of driving unit 100').

Continuing with reference to FIG. 7, as the lower portion 106' of the driving unit 100' is removed from the material to be machined (e.g., sheet metal 103), the piston 144 correspondingly retracts to raised position within the die 140, such that vacuum is created in reservoir 146 to draw more lubricant thereto. In certain embodiments, such refilling of the reservoir 146 with lubricant can be performed via action of second valve 150 in communication with the reservoir 146 on one end and source reservoir 152 of further lubricant on other end of the valve 150. Further, in order to prevent excess buildup of lubricant in the tapping reservoir 146, one or more channels 154 can be defined within the die 140 so as to extend from an upper opening 146a of such reservoir 146 toward weep holes 156 defined in the die 140.

To this point, the designs described herein have primarily focused on aspects for enhancing the effectiveness and efficiency of force transfer via the embodied driving units. For example, from ram stroke to driving of the tool (e.g., tap), the transfer of linear to rotational force is better distributed/balanced with use of the driving unit, whereby strength of the assembly is bolstered, lessening potential of adverse impact on the tool during use while increasing amount of corresponding output derived from the tool, at least in terms of its rotation. While continuing with this focus, further designs are now exemplified. Starting with FIG. 9, an exploded view of a tool assembly 200 is shown. The assembly 200 includes a driving unit 202 formed of a transmission assembly 204 and a helix drive 206. To that end (and as will be further detailed below), the driving unit 202 functions similarly to the driving units already exemplified herein (relative to force transfer), with the transmission assembly 204 containing the gearing stages or configuration, such as planetary gearing, for enhancing output (increasing rotation) and the helix drive 206 for converting the input linear force to rotational to actuate the transmission assembly 204. To that end (and as already noted above), given the limited ram distance (stroke) generally available in presses, the combined use of staged gearing configurations (e.g., transmission assembly 204) and angled helix (e.g., drive 206) provides a compact solution to function with the limited ram stroke and maximize output rotations. Accordingly, the potential variety of applications for tapping tools, relative to material thicknesses and thread pitches being achieved, is greatly expanded. In contrast, conventional tapping units have been known to involve a single rotational element/linear drive.

Figure 9:
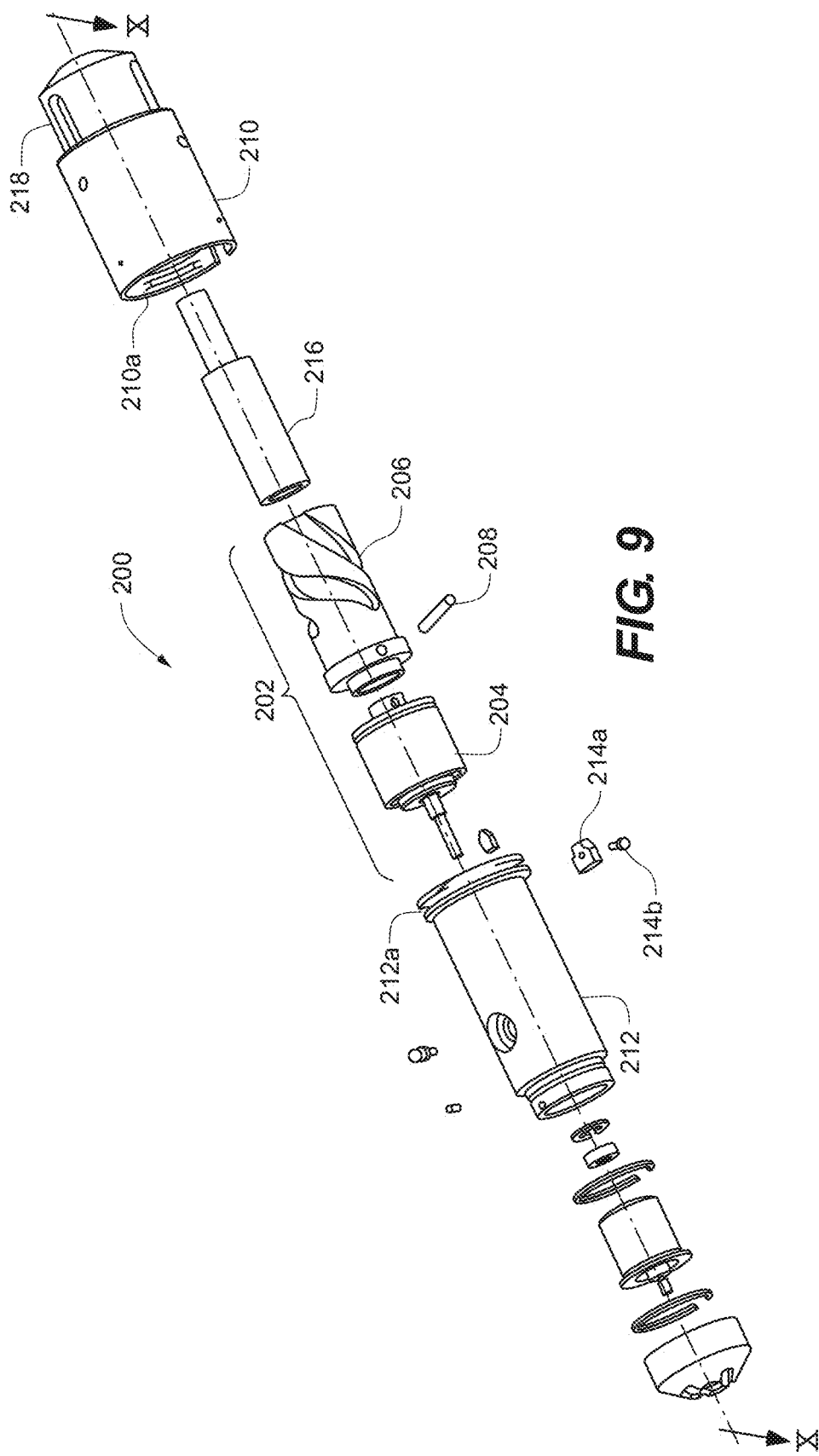
FIG. 9 is an exploded view of tool assembly with exemplary driving unit in accordance with certain embodiments of the invention.

With continued reference to FIG. 9 and the driving unit 202 of the assembly 200, the transmission assembly 204 is formed as a modular unit. In certain embodiments, as shown, the assembly 204 can be operatively coupled (e.g., via dowel pin 208) to the helix drive 206, and with reference to FIG. 10 (showing cross sectional view of tool assembly 200 of FIG. 9 as assembled along line X-X), the driving unit 202 is configured to be housed within the tool assembly 200. To that end, in certain embodiments as shown, the tool assembly 200 can be configured for disassembly by the user such that the transmission assembly 204 and/or the helix drive 206 can be retrofitted or replaced from the tool assembly 200 as is necessary or desired in the field. Moreover, and as further described with reference to FIG. 11 (showing partial exploded view of select portions of the tool assembly 200), the modular nature of the transmission assembly 204 enables variable configuring by the user, e.g., swapping out one transmission assembly 204 for another, so the driving unit 202 can be correspondingly configured to be most suitable for its intended use/application, e.g., based on tooling to be used with the tool assembly 200 and material(s) to be machined.

Figure 10:
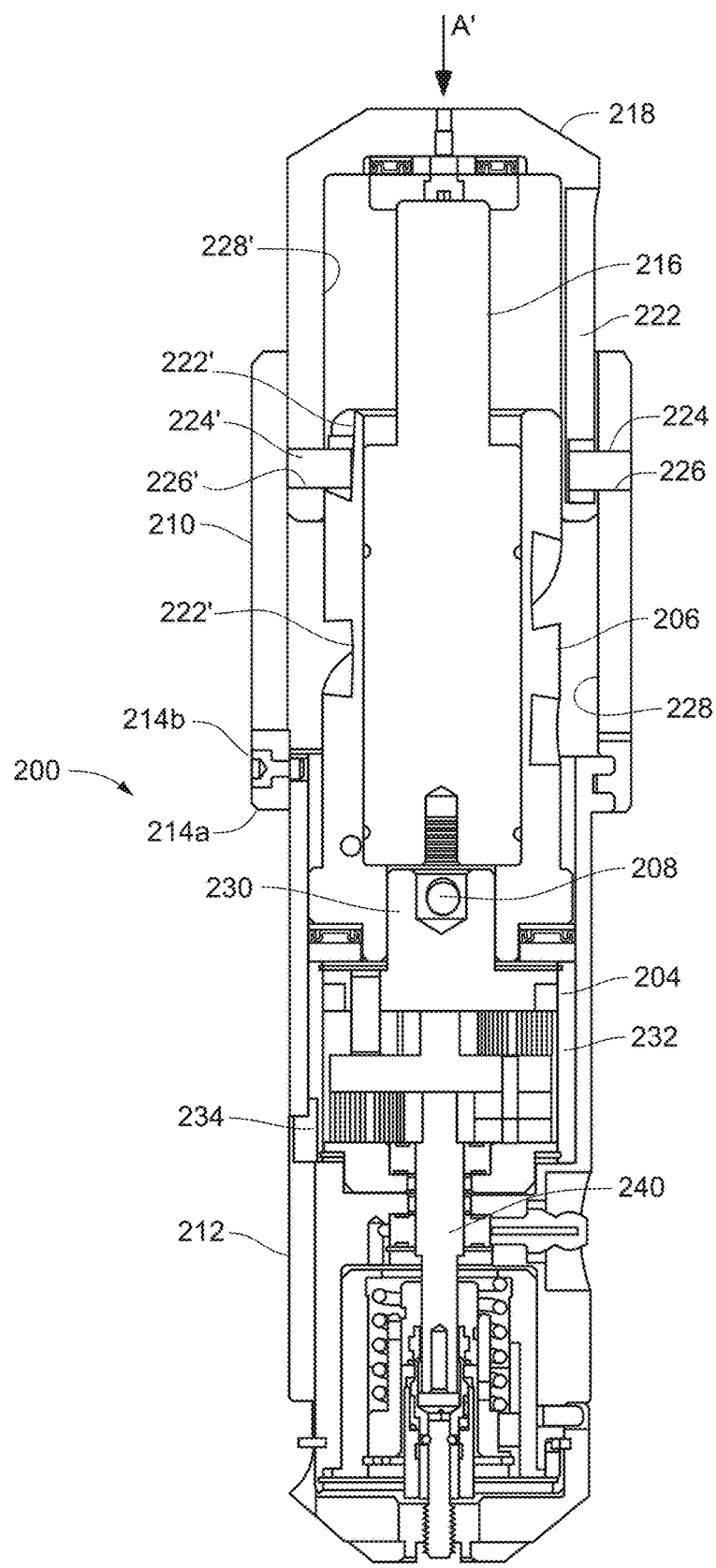
FIG. 10 is a cross sectional view of side of the tool assembly of FIG. 9 as assembled in accordance with certain embodiments of the invention.
Figure 11:
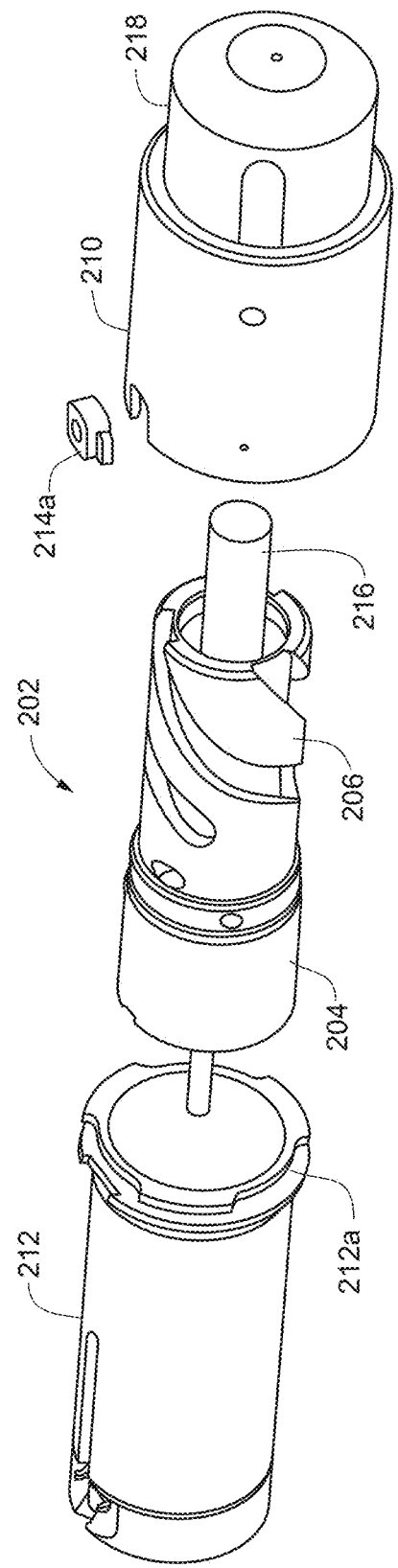
FIG. 11 is a exploded view of select portions of the tool assembly of FIG. 9.

As alluded to above, to enable and encourage retrofitting/configuring relative to the driving unit 202 based on the intended use, the tool assembly 200 is configured for ease of disassembly by the user in the field. With reference to FIG. 10 (and FIGS. 9 and 11), the tool assembly 200 is relatively compact and streamlined in form, via use of similarly-shaped upper and lower housings 210, 212 to contain and/or support the corresponding components of the assembly 200 including the driving unit 202. With such compact/streamlined form, the tool assembly 200, in certain embodiments, can be used with any of a variety of metal-fabricating presses or other machines (and tools therefor needing to be driven and rotated). One such machine that would be predisposed for being retrofit with the tool assembly 200 would involve a turret press, whereby the assembly 200 could be simply positioned therein (e.g., in a bore on the upper table thereof); however, in the case of presses, the assembly's design could just as well be utilized with any variety of industrial press types, including single-station, Trumpf style machines and other rail type systems, press brakes, sheet feed systems, coil feed systems, as well as other types of fabrication equipment adapted for punching or pressing sheet materials.

Shifting back to the concept of disassembly by the user, and starting from FIG. 9 (and with reference to FIG. 10), the upper housing 210 and lower housing 212, in certain embodiments, can be configured with mating threads on corresponding ends thereof. For example, the tool assembly 200 is shown with upper end of the lower housing 212 having outer threading 212a so as to mate with inner threading 210a at lower end of the upper housing 210. However, the invention should not be limited to such, as other coupling or alternate threaded configurations for the housings 210, 212 could just as well be used. As further shown, a form of key fastener can be used to subsequently lock the housings 210, 212 together. In certain embodiments, this fastener can take the form of an insert 114a and/or a corresponding fastener 114b, e.g., for retaining the insert 114a; however, the key fastener could further be any of a wide variety of other fastener types and function just as well. For disassembly (e.g., with use of threaded housings and interlocking key fastener), the fastener 114b/insert 114a are unscrewed/removed and the upper housing 210 can subsequently be rotated relative to the lower housing 212 so as to unlink the two, thereby providing access to the driving unit 202 (see FIG. 11) as well as other internal components. Relative to assembly (or reassembly), following desired retrofitting or replacement relative to the driving unit 202, the upper housing 210 is threaded to the lower housing 212, and the insert 114a/fastener 114b are subsequently added/screwed to retain and lock the housings relative to each other.

With the above serving as an introduction to some of the features of the tool assembly 200, it should be appreciated that other features thereof are simply exemplary in nature. For example, while the configuration of the driving unit 202 involves the helix drive 206 positioned atop the transmission assembly 204, it should be appreciated that the above-described aspects would also be applicable for tool assemblies having reversed configuration (e.g., with reference to that already described for the driving unit 100 of FIG. 1). To that end, the versatility described above for the tool assembly 200, e.g., relative to disassembly by user and configuring of the driving unit 202 as warranted, have not generally been considerations for conventional driving mechanisms for tapping tools. This is largely due to the conventional designs being quite complex in nature and particularly configured, such that any disassembly would risk function being adversely affected. As such, conventional mechanisms have generally been configured as structures that are wholly replaced, without alteration in the field, much less being readily configured in the field based on an intended use/application, as has been noted herein.

Continuing with the above, and as compared to conventional designs, in certain embodiments, the tool assembly 200 is configured with a dynamic biasing member 216 (such as a gas, e.g., nitrogen, spring) as opposed to a mechanical (e.g., coil spring) version. As will be further explained, in certain embodiments, the tool assembly 200 is designed for the biasing member 216 to be more dynamic as opposed to mechanical alternatives. Particularly, with the transmission assembly 204 and/or helix drive 206 of the tool assembly 200 being designed for reconfiguration/retrofitting in the field, the recoil force/distance that is needed can vary correspondingly, which would be more variably accommodated via use of gas spring. For example, in certain embodiments, gas springs can be provided so as to provide 800 pounds of recoil force over travel distances from 1.5" to 3.5". To that end, use of a gas spring for the biasing member 216 enables recoil parameters being met for a wide variety of transmission assembly 204/helix drive 206 combinations, while also being user-friendly relative to user configuring of the tool assembly 200 in the field.

Figure 12:
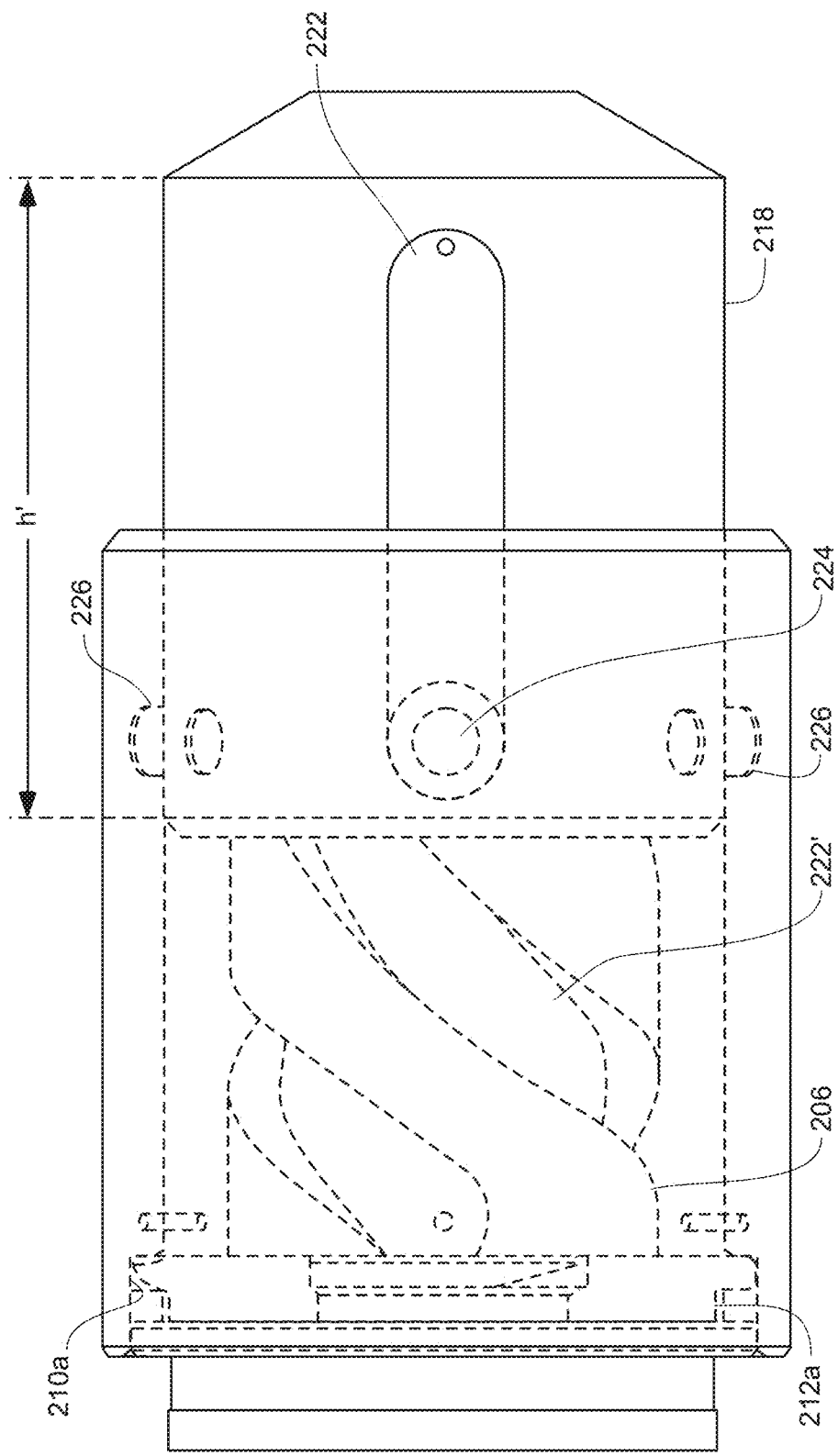
FIG. 12 is a side partial view of tool assembly of FIG. 9 as assembled, showing internal view of upper portion of the unit.

Shifting back to FIG. 10, the tool assembly 200 is shown oriented similar to that when used within a metal-fabricating machine. To that end, when selected for use in the machine, the assembly 200 is moved to vertically align with, and then be struck by, ram of machine. Head portion 218 of the assembly 200, upon being driven vertically downward (via driving force A', e.g., ram stroke) moves relative to the upper housing 210, with the head portion 218 and housing 210 being operably linked. For example, in certain embodiments (and perhaps best shown in FIGS. 12 and 13), along the longitudinal extent h' of the head portion 218, a plurality of channels 222 are defined, along which a corresponding plurality of bearings 224 are configured to move. In certain embodiments as shown, the bearings 224 are rigidly secured to, and protrude from, corresponding inner bores 226 defined in the upper housing 210. To that end, and perhaps best seen in FIG. 10, the upper housing 210 is defined with inner recess 228 sized to receive the head portion 218, such that the channels 222 receive the corresponding bearings 224. Given such linkage between the upper housing 210 and the head portion 218 (and with continued reference to FIGS. 12 and 13), upon being struck by the machine ram, the entire tool assembly 200 is driven downward until the opposing tool end contacts the workpiece, at which point, the head portion 218 moves vertically downward relative to the upper housing 210, with corresponding downward movement of the channels 222 about the bearings 224.

Figure 13:
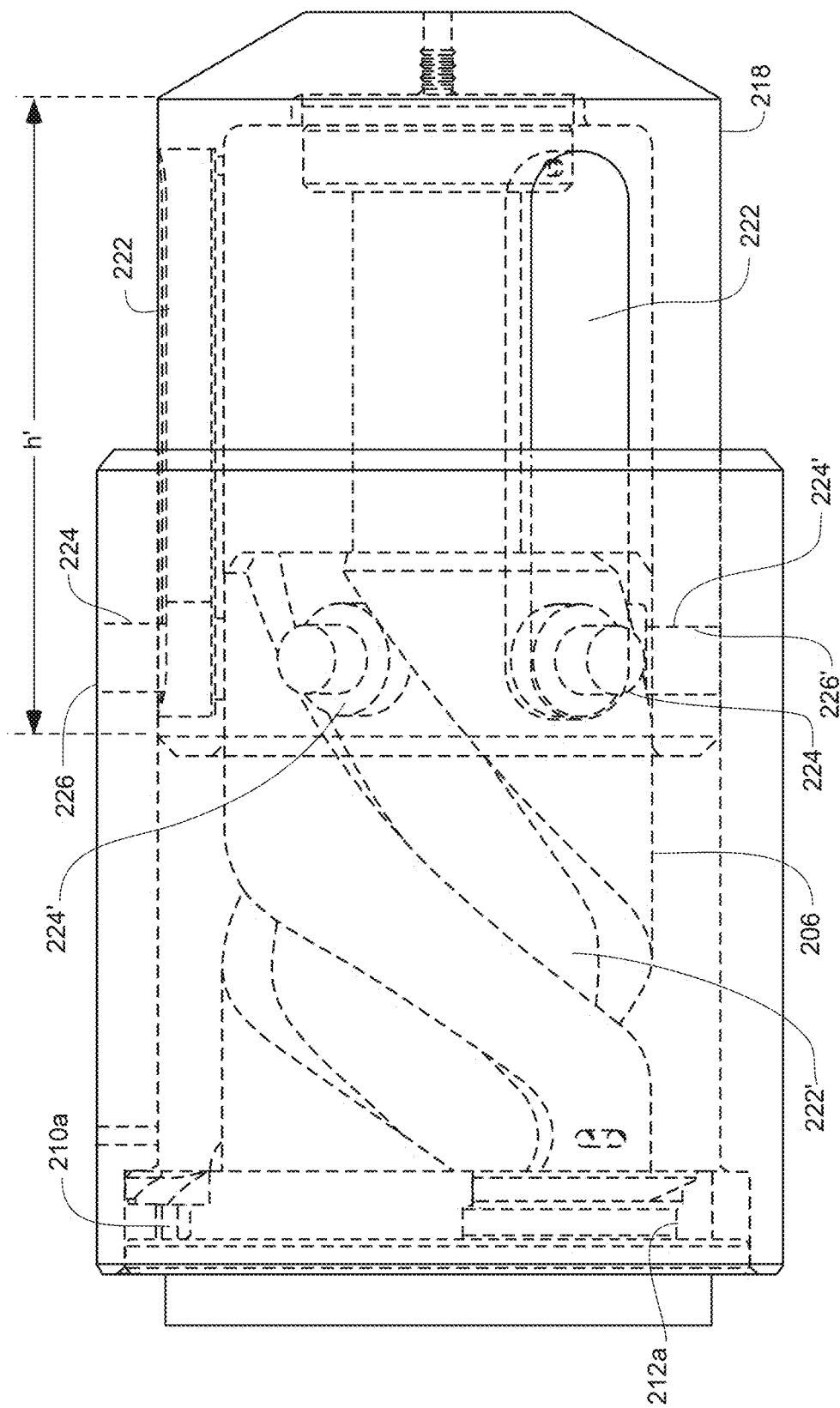
FIG. 13 is a further side partial view of tool assembly of FIG. 9 as assembled, showing internal view of upper portion and head of the unit.
Figure 14:
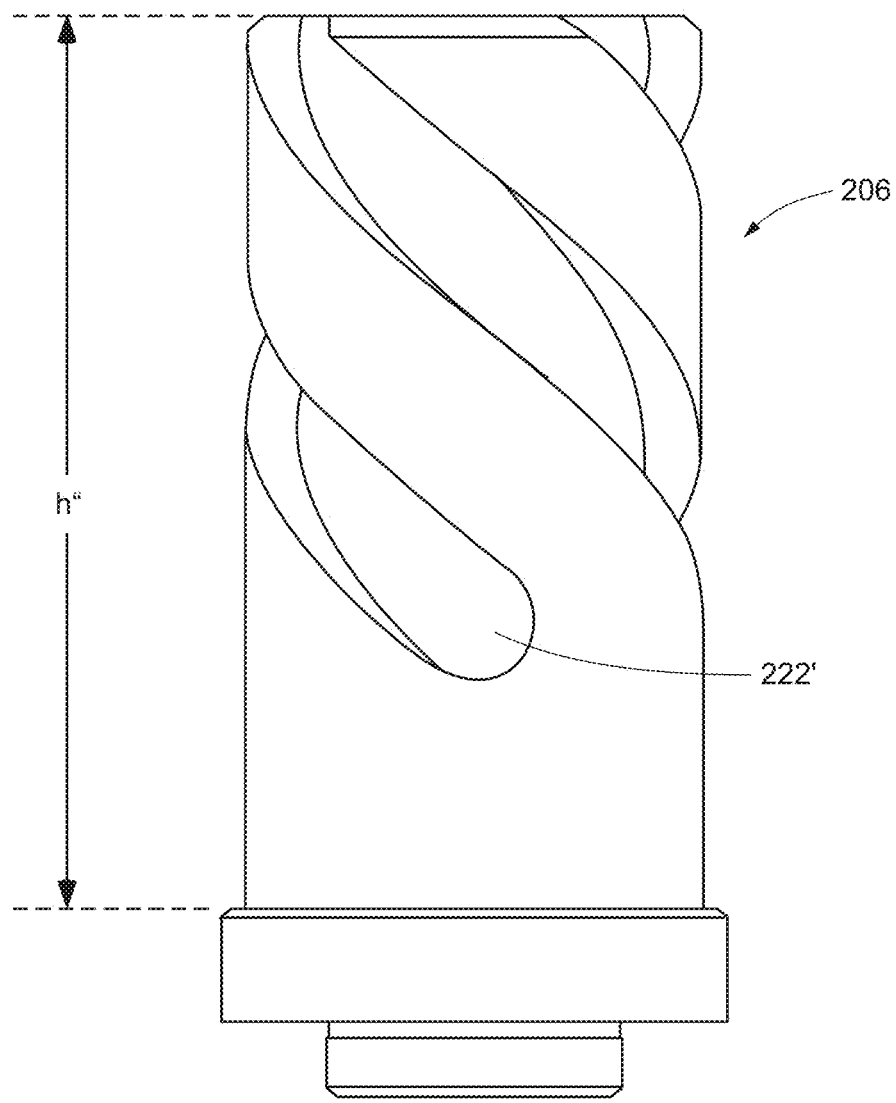
FIG. 14 is a side view of a helix drive in accordance with certain embodiments of the invention.

Similar to the head portion 218 and upper housing 210, the head portion 218 and the helix drive 206 are also operably linked. With reference to FIG. 14 (and continued reference to FIGS. 12 and 13), in certain embodiments, along the extent h" of the helix drive 206, a plurality of upwardly-curving channels 222' are defined, along which a corresponding plurality of bearings 224' are configured to move. With reference to FIGS. 10 and 13, in certain embodiments, the bearings 224' are rigidly secured to, and protrude from, corresponding inner bores 226' defined in the head portion 218. To that end, and perhaps best seen in FIG. 10, the upper housing 210 is defined with inner recess 228' sized to receive the helix drive 206, such that the channels 222' receive the corresponding bearings 224'. Perhaps best appreciated from FIG. 13, given this linkage between the head portion 218 and the helix drive 206, as the head portion 218 is moved linearly downward, corresponding downward linear forces are exerted on the bearings 224'. However, on account of the bearings 224' being rigidly secured to the head portion 218 and the head portion 218 generally being prevented from rotating via linkage with the upper housing 210 (as already described) which is correspondingly locked within the machine (e.g., turret table bore), the downward linear force on the bearings 224' causes their downward movement along the corresponding channels 222' of the helix drive 206. Although, again given that the head portion 218, and correspondingly, its bearings 224', are held stationary (so as to not rotate), the movement of the bearings 224' within the channels 222' (and the downward forces on the bearings 224' exerted on the bottom surfaces of the corresponding channels 222') results in corresponding rotation of the helix drive 206.

Figure 15:
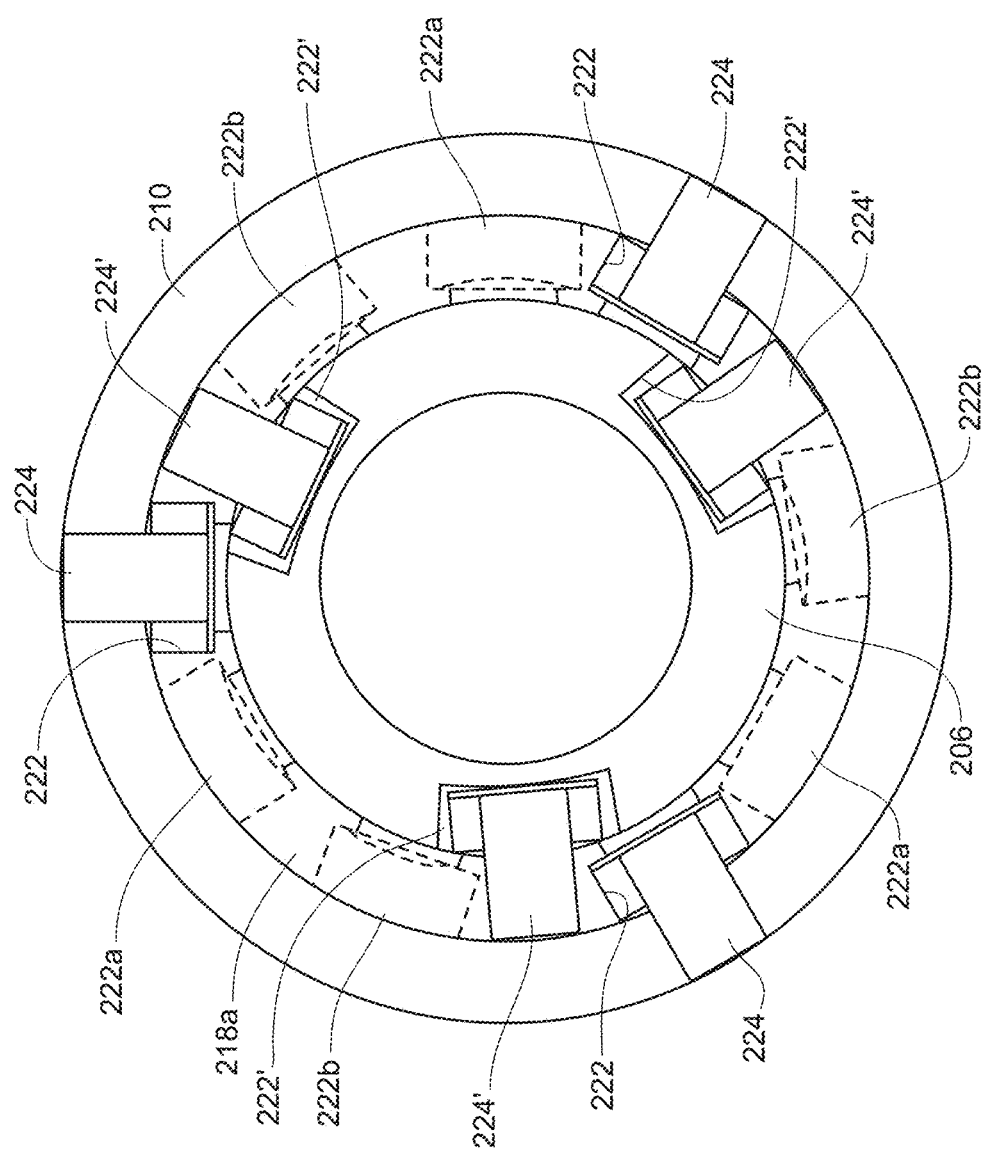
FIG. 15 is a cross sectional view of upper portion of the tool assembly of FIG. 19 taken along the line XV-XV in accordance with certain embodiments of the invention.

In certain embodiments, as shown in FIG. 15, the bearings 224 of the upper housing 210 and the bearings 224' of the head portion 218 are situated at equal distances about their inner recesses 226, 226'. For example, in certain embodiments as shown, a quantity of three bearings 224 are employed with respect to the upper housing 210 and a quantity of three bearings 224' are employed with respect to the head portion 218. To that end, in having each of these bearing sets 224, 224' respectively positioned at equal distances from each other, with 120° separation therebetween, and with each either extending from, or extending to, the head portion 218, the 120° distribution of each trio of bearings 224, 224' is offset from each other on the head portion 218. To that end, and as will be described later, the head portion 218, in certain embodiments as shown, can be configured with additional sets of channels 222a, 222b therein, adjacent to the initial set of vertically-oriented channels 222.

Figure 16:
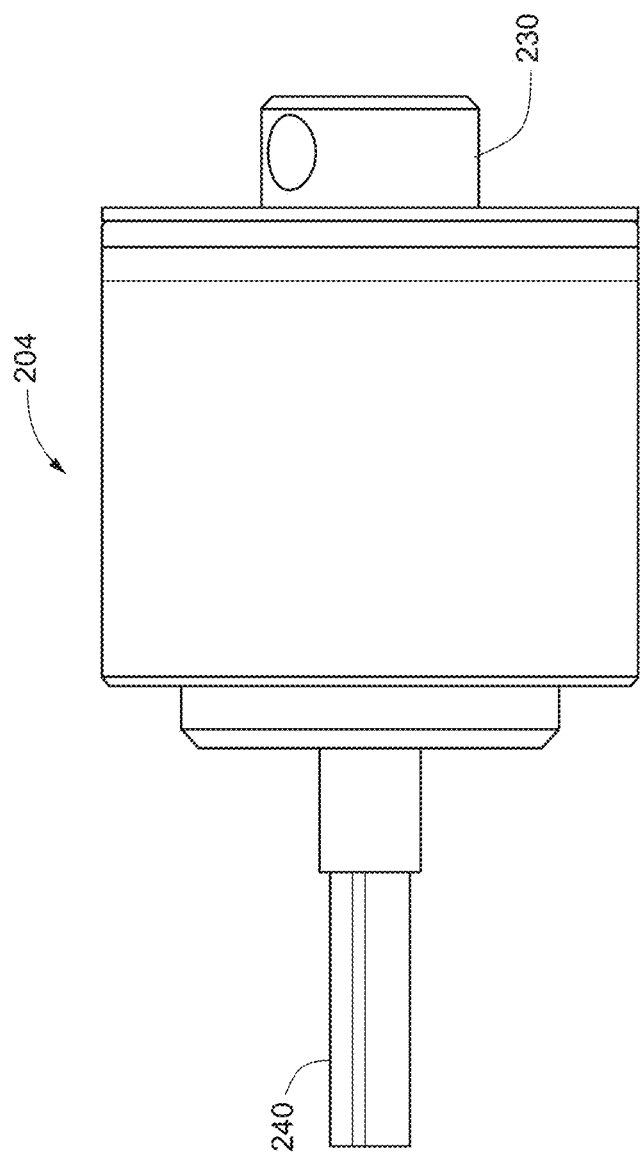
FIG. 16 is a side view of a transmission assembly from the tool assembly of FIG. 9.
Figure 17:
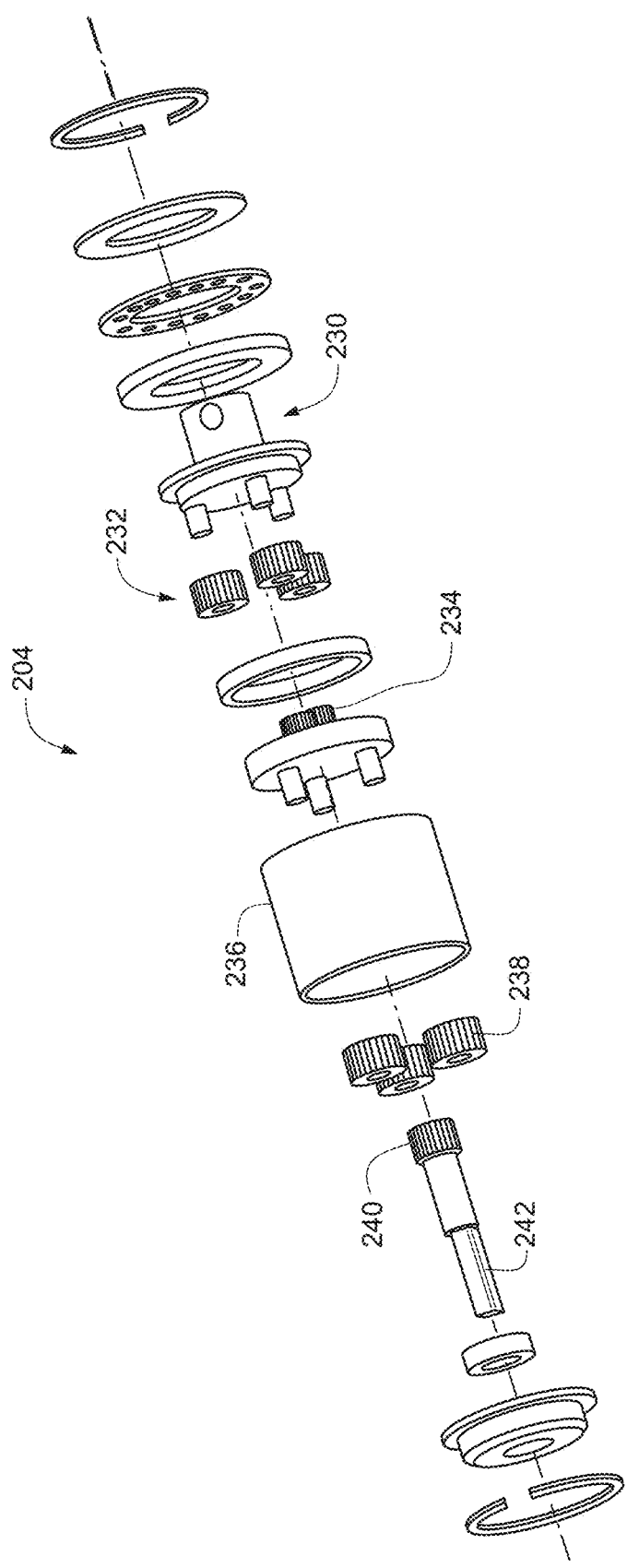
FIG. 17 is an exploded view of the transmission assembly of FIG. 16.

Shifting back to use of the tool assembly 200, and picking up with rotation of the helix drive 206, reference is made to FIG. 10 as well as FIGS. 16 and 17, respectively illustrating side view of the transmission assembly 204 and exploded view thereof. As previously noted, the helix drive 206 can be operatively coupled to the transmission assembly 204, e.g., via dowel pin 208, in forming the driving unit 202 for the tool assembly 200. With this coupling, the rotation of the helix drive 206 forms the input to the transmission assembly 204, and the gearing configuration, e.g., planetary gearing, contained therein. As already exemplified herein, planetary gearing can be effectively used in enhancing output (increasing rotation) of the tool (e.g., tap) to be driven and rotated. To that end, via use of ring, multiple sets of planet gears and sun gear, and depending on the number of stages of planet gears, the output rotation of the transmission assembly 204 becomes a multiple of the input rotation. In particular, with reference to the exploded view of FIG. 17, rotation of coupling stem 230 results in corresponding rotation of first set of planet gears 232, followed by corresponding rotation of second set of planet gears 238 via first sun gear 234, followed by corresponding rotation of second sun gear 240 that is operably linked to the insert 240 for the tool (e.g., tap). As already described herein, the more centralized gears have greater corresponding quantity of rotations, and thus the tool (e.g., tap) is rotated accordingly, with the planet gears 232 and 238 in outer rotational contact with central ring gear 236.

To this point, various driving unit designs have been exemplified, as well as tool assembly designs equipped with driving unit designs. Relative to these embodiments, much focus has been directed to use of planetary gearing within the driving units 100, 202 to not only increase the output in terms of quantity of rotations, but also provide better distribution/balancing of the output rotational force while enhancing its magnitude (in terms of increased rotations). In addition, by providing the driving unit as a modular component (e.g., wholly or one or more of its separable portions, i.e., transmission assembly and/or helix drive), the user is able to retrofit and configure tool assemblies, e.g., with pop-in transmission assembly that is more desirable for the application. In providing a bookend of sorts to that same concept, again with focus on one or more of system effectiveness, efficiency, and versatility, further designs are now exemplified. In certain embodiments, one or more other components are further altered, e.g., relative to the helix drive of driving unit and/or the head portion of tool assembly.

Figure 18:
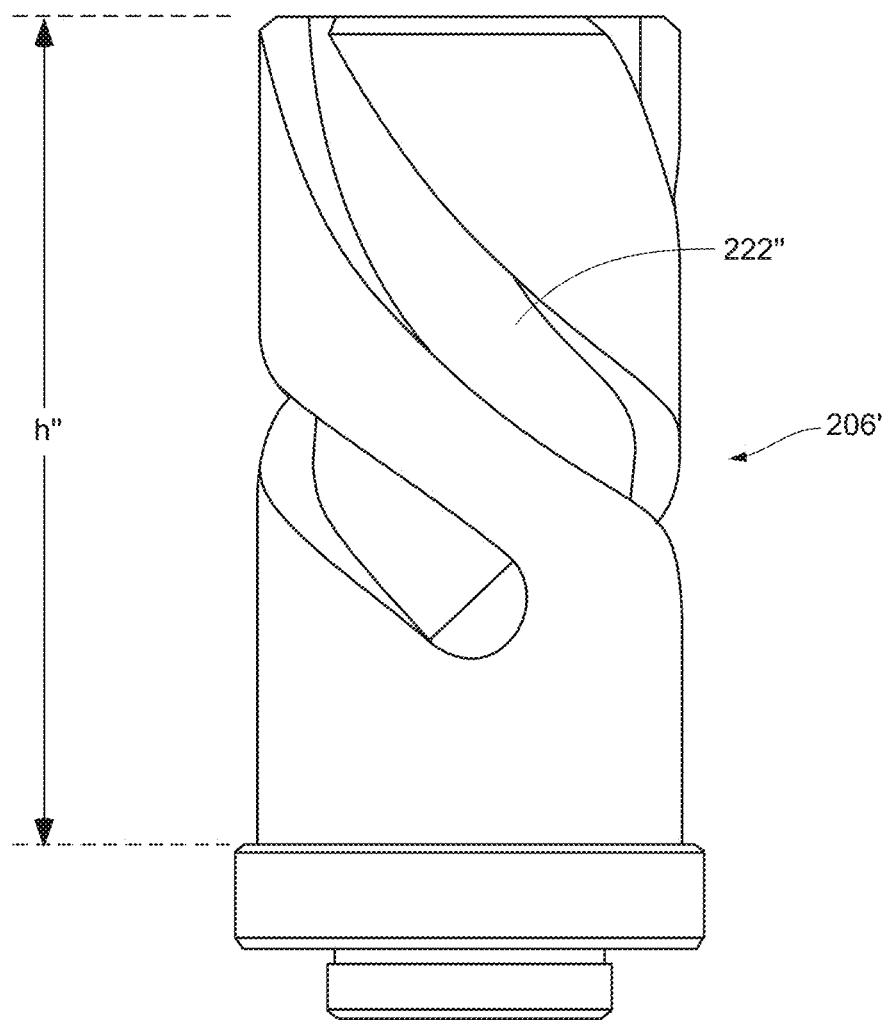
FIG. 18 is a side view of another design of helix drive in accordance with certain embodiments of the invention.

Starting with reference to the helix drive 206 of the tool assembly 200, which is perhaps best shown in FIG. 14, other helix designs have been considered, as exemplified with helix drive 206' of FIG. 18. Prior to discussing the differences between the two drives 206 and 206', it should be understood that the helix drive plays an important role relative to transfer of input force from linear to rotational. From analysis of this transfer, it is known that the starting and end cycles or working periods for the helix drive are the most stressful in terms of force. Particularly, with respect to starting period, the helix drive is rotated from rest, and with the end period, the helix drive is reversed, so likewise, the drive comes to a stop and is driven to rotate in the opposite rotational direction. In certain embodiments, as illustrated with the drive 206' of FIG. 18, the areas between the channels 222" are changed from being uniform. For example, in certain embodiments as shown, the areas between the channels 222" at their ends is narrowed, while these areas expand as the channels 222" extend to the helix drive end. To that end, the effect of this change in design is the decreased angle of the channels (relative to the drive's length). Particularly, in sloping the thread of the channels 222" to be less angular relative to the direction in which the helix drive is moved from downward stroke of the machine ram, the less stress with respect to the starting and end cycles or working periods of the helix drive.

Continuing with the above, it should be appreciated that the total output rotation from a given ram stroke force, at least to this point, depends on design parameters of the transmission assembly 204 and the helix drive 206. For example, in certain embodiments, the design parameters include channel configuration and angling for the helix drive 206, as well as rotation output ratio from the transmission assembly 204. As just one example, in certain embodiments, the gearing stages of the transmission assembly 204 are configured to have a 20:1 ratio, and with a 0.4 rotation of the helix drive 206, the total output is 8 revolutions. To that end, such would be what is generally requisite from a tap driving unit used at a press, C-station size. Alternately, in certain embodiments, changing the transmission assembly 204 such that its gearing stages provide a 25:1 ratio, and adding the further-angled helix drive 206', the total output can be provided as at least 12 revolutions relative to a 0.5 rotation of the drive 206'.

Figure 19:
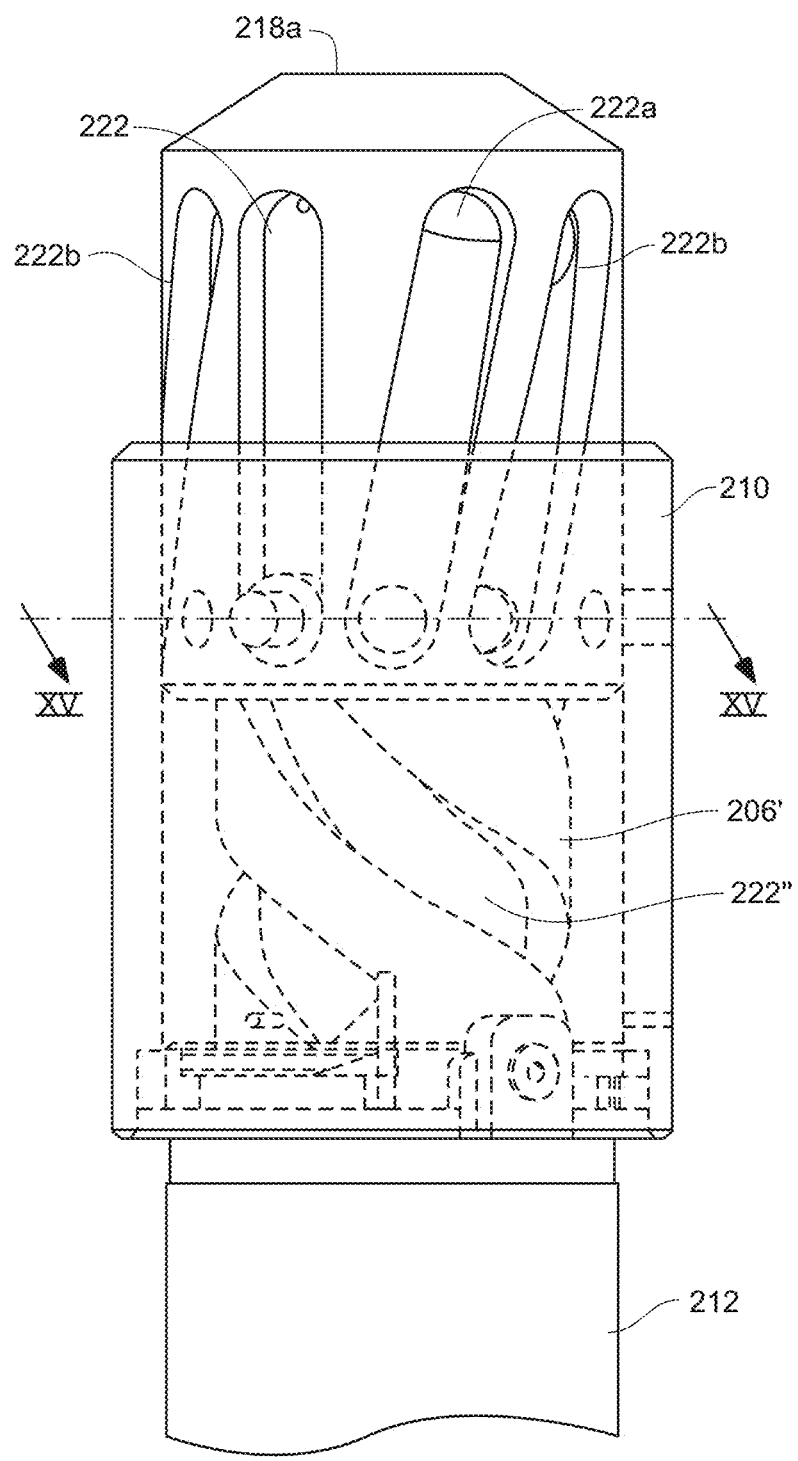
FIG. 19 is a side partial view of a design variation of tool assembly of FIG. 9 as assembled in accordance with certain embodiments of the invention, showing internal view of upper portion of the unit.
Figure 20:
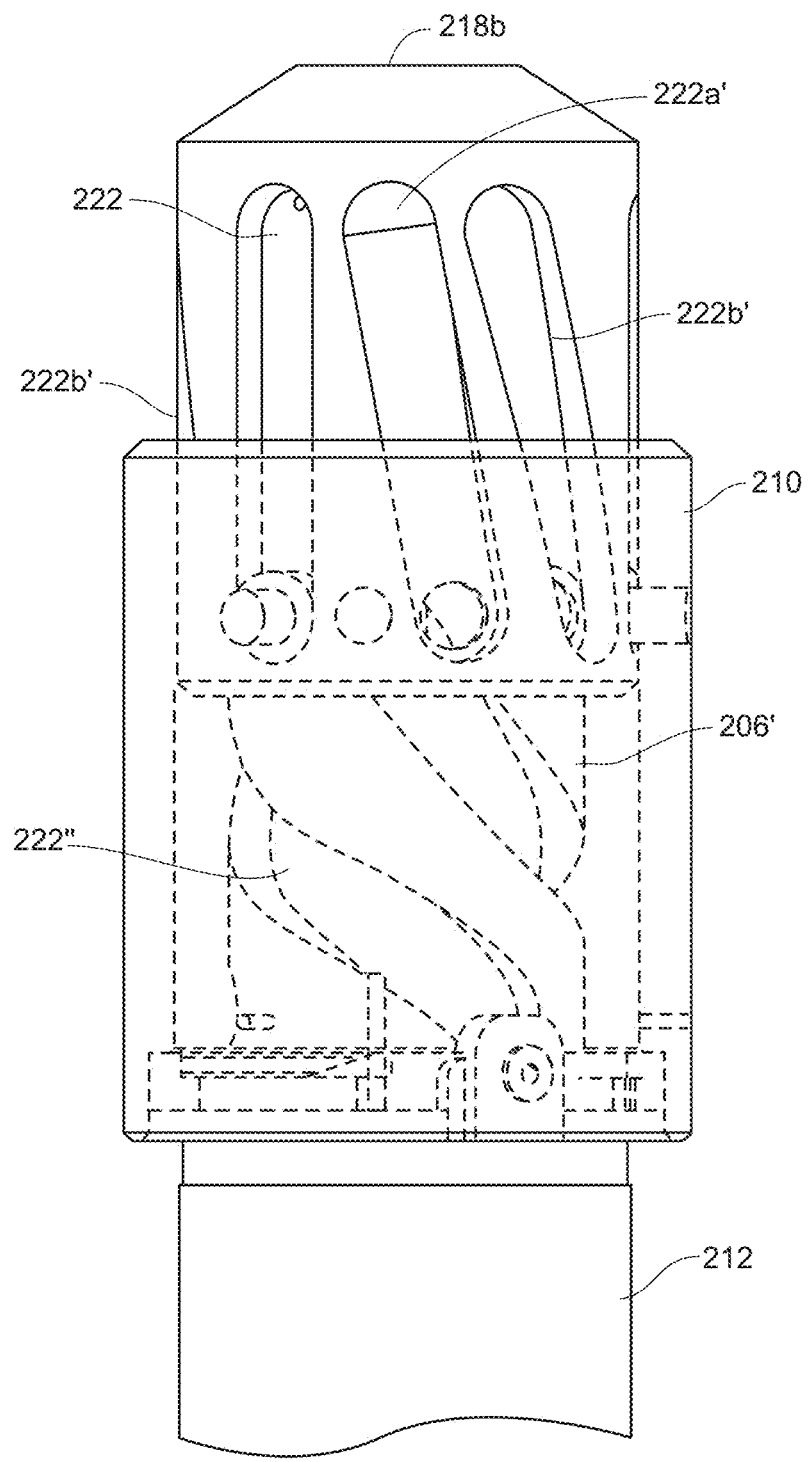
FIG. 20 is a side partial view of another design variation of tool assembly of FIG. 9 as assembled in accordance with certain embodiments of the invention, showing internal view of upper portion of the unit.
Figure 21:
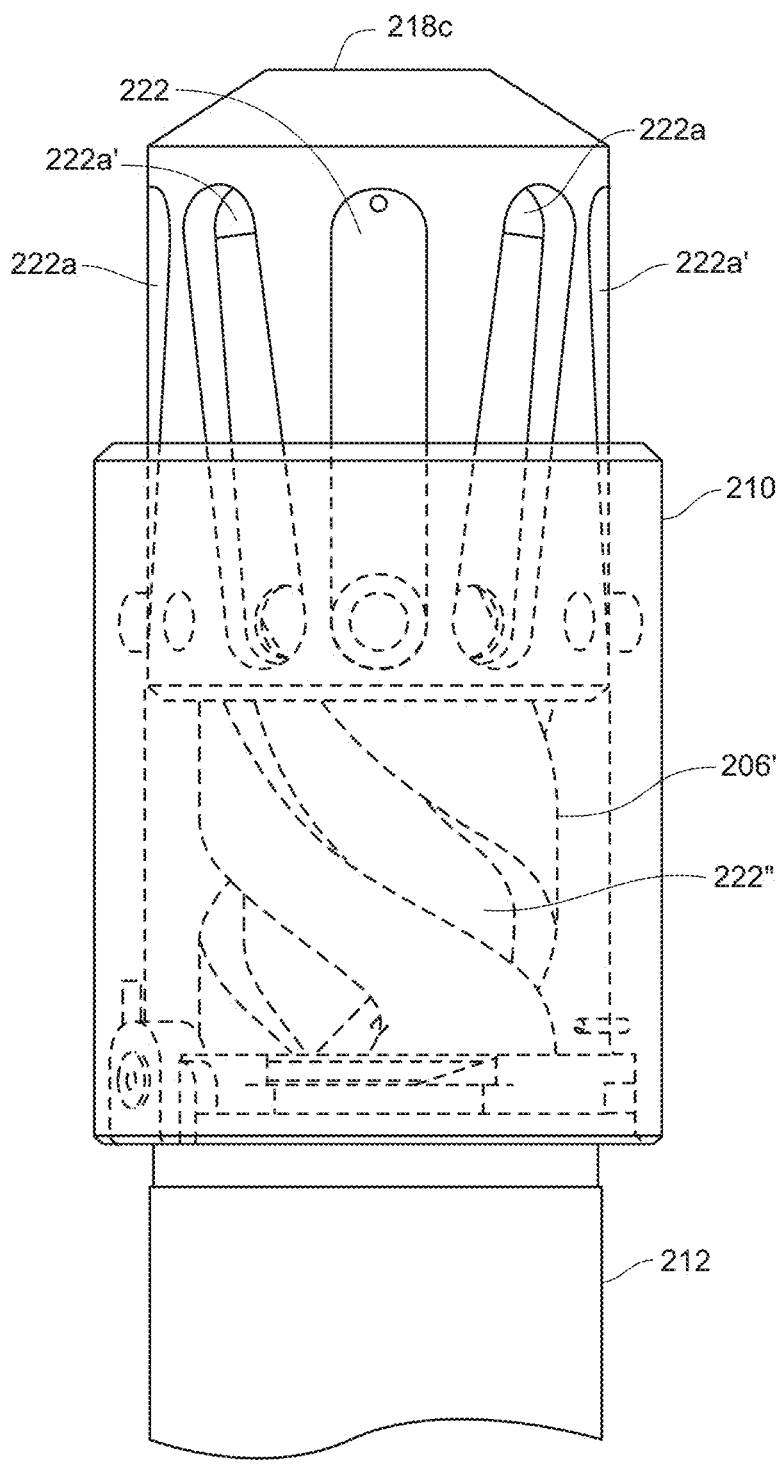
FIG. 21 is a side partial view of a further design variation of tool assembly of FIG. 9 as assembled in accordance with certain embodiments of the invention, showing internal view of upper portion of the unit.

Shifting to focus on the head portion 218 of the tool assembly 200, reference is made to FIGS. 19-21. As described to this point, the channels 222 defined in the head portion 218 have been vertically oriented, so as to be in about the same direction as (or generally parallel to) the direction of ram stroke from the metal-fabricating machine. As such, the channels 222, while being used with corresponding bearings 224 to operably couple the head portion 218 to the upper housing 210, have mainly set the length by which the ram can downwardly drive the head portion 218, and correspondingly the length along which the helix drive is rotated. To that end, based on the layout of the channels 222" as they are defined in the helix drive 206' as shown, the drive 206' is rotated in clockwise direction upon the stroke of the ram impacting the head portion 218. However, as alluded to relative to FIG. 15, in certain embodiments, the head portion 218 can be defined with further channel sets of differing slopes relative to ram stroke direction in order to impact speed of the force transfer, thereby causing increased or decreased speed, as warranted.

For example, starting with FIG. 19, two other sets of channels 222a and 222b are defined in the head portion 218a besides the vertically-oriented channels 222. As shown, these additional channel sets 222a, 222b each extend crosswise relative to the channels 222" of the helix drive 206'. To that end, when provided in either of the selected channel sets 222a or 222b, the bearings 224 would be directed upward in the channels upon ram stroke on the head portion 218a so as to rotate the head portion 218a in clockwise direction. Accordingly, the channels 222a and 222b, when used, would help increase the speed of rotation of the helix drive 206' from ram stroke, as the clockwise rotation of the head portion 218a would contribute to/enhance the clockwise rotation of the helix drive 206'. As should be appreciated, the channel set 222b, having greater slope than the channel set 222a, provides a correspondingly greater increase of rotation speed to the helix drive 206'.

Conversely, turning to FIG. 20, two other sets of channels 222a' and 222b' are defined in the head portion 218b so as to be more in alignment relative to the channels 222" of the helix drive 206'. To that end, when provided in either of the selected channel sets 222a' or 222b', the bearings 224 would be directed upward in the channels upon ram stroke on the head portion 218b so as to rotate the head portion 218b in counter-clockwise direction. Accordingly, the channels 222a' and 222b', when used, would help decrease the speed of rotation of the helix drive 206' from ram stroke, as the counter-clockwise rotation of the head portion 218b would detract/hinder the clockwise rotation of the helix drive 206'. As should be appreciated, the channel set 222b', having greater slope than the channel set 222a', provides a correspondingly greater decrease of rotation speed to the helix drive 206'.

Continuing with reference to FIGS. 19 and 20, increasing the rotation speed of the helix drive 206' could be desired, for example, to speed up the overall work order provided the machined material would not cause damage to the tool at such speed, while decreasing the rotation speed of the drive 206' could be desired, for example, if the material being machined is hard whereby standard or increased speed would damage the tool. Shifting to FIG. 21, the head portion 218c is defined to have sets of channel sets 222a and 222a' (from each of the above-noted head portions 218a and 218b), thereby equipping the head portion 318c to increase speed (222a), decrease speed (222a'), or not impact speed (222) relative to the helix drive rotation from the ram stroke.

Figure 22:
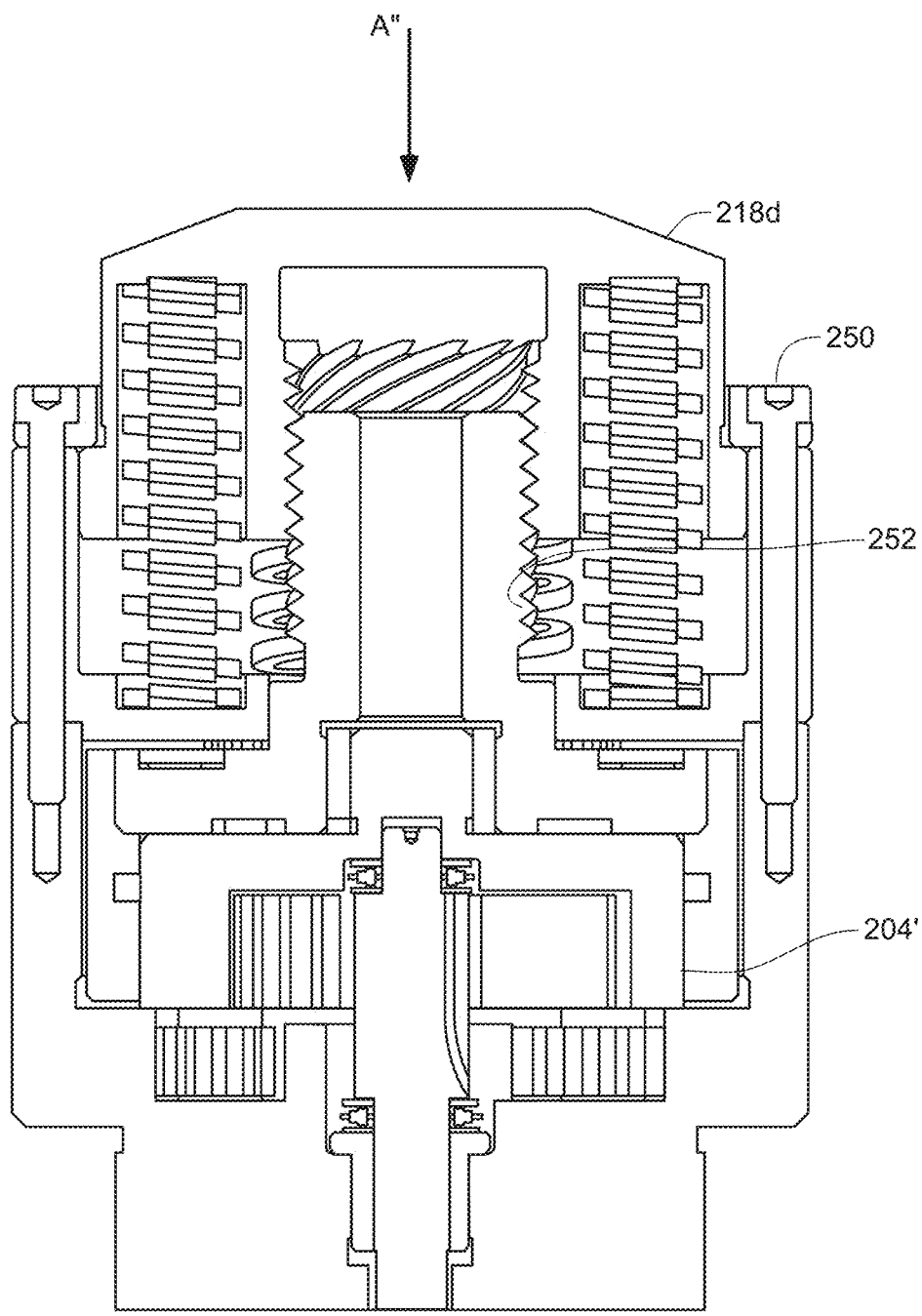
FIG. 22 is a side partial cross section of a tool assembly using threaded helix and internal threaded coupling with the head portion in accordance with certain embodiments of the invention.
Figure 23:
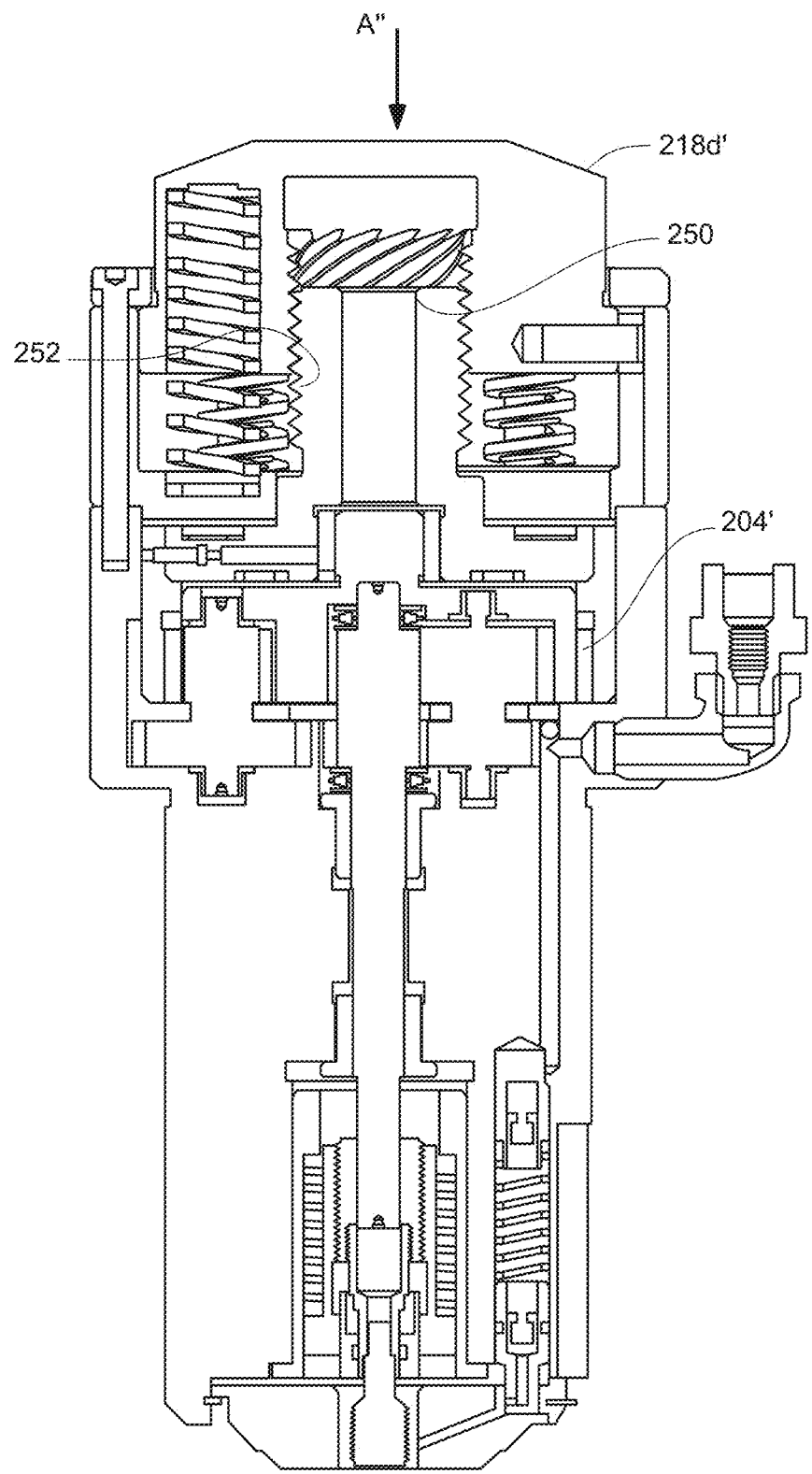
FIG. 23 is a side cross section of a further tool assembly using threaded helix and internal threaded coupling with the head portion in accordance with certain embodiments of the invention.

Further regarding variations on the head portion, in certain embodiments, a threaded helix 250 can be incorporated (threaded) therewith, as exemplarily illustrated in FIGS. 22 and 23. To that end, the head portion 218d would be defined with internal threading 252 so given the linear downward force A" (from ram stroke) on the head portion 218d, there would be a translated rotational force immediately relative to the threaded helix drive 250, i.e., being forced downward along the internal threading 252. To that end, the head portion 218d and the outer housing 254 of the tool assemblies of FIGS. 22 and 23 would be rotationally fixed, such that the rotational forces initiate from the threaded helix 250. In turn, in certain embodiments, the threaded helix 250 is operably coupled with the transmission system 204' such that the rotational motion of the helix 250 is transferred directly to the planetary gearing therein.

Thus, embodiments of a DRIVING SYSTEM FOR MACHINING TOOLS OR OTHER TOOLING USUABLE WITH METAL-FABRICATING PRESSES OR OTHER MACHINES are disclosed. One skilled in the art will appreciate that the invention can be practiced with embodiments other than those disclosed. The disclosed embodiments are presented for purposes of illustration and not limitation, and the invention is limited only by the claims that follow.

What is claimed is:

1. A driving unit for tooling usable with metal-fabricating presses or other machines comprising:
a first portion and a second portion operably linked to the first portion so as to be movable relative to the first portion, whereby in event of a downward force contacting the first portion and contact being made between the second portion and a rigid structure, upward movement of the second portion results relative to the first portion;
an assembly for tooling;
a gearing configuration operably linked to the assembly for tooling;
a singular helix drive that operably links the gearing configuration to one of the first portion or the second portion;
whereby in event of the upward movement of the second portion, a corresponding transfer of force results and comprises input linear force being transferred to output rotational force, whereby said transfer of force results from the linkage and corresponding movements of the one of the first portion or the second portion and the helix drive relative to each other;
wherein the helix drive is rotatable relative to the second portion, whereby rotation of the helix drive is triggered by the upward movement of the second portion;
wherein the assembly for tooling is situated below and in line with the helix drive.

2. The driving unit of claim 1 wherein the gearing configuration comprises planetary gearing, and wherein an input or ring gear of the planetary gearing is operably linked to the helix drive, whereby the rotation of the helix drive corresponds with a same rotation of the input gear.

3. The driving unit of claim 2 wherein the helix drive comprises a casing extending from the helix drive, the input gear being internally situated and linked to the casing.

4. The driving unit of claim 2 wherein a rotation of the input gear results in a greater rotation of an output gear of the planetary gearing, wherein the output gear is operably linked to the assembly for tooling, whereby a rotation of the output gear corresponds with a same rotation of the assembly for tooling.

5. The driving unit of claim 4 wherein the planetary gearing comprises one or more sets of intermediary or planet gears operably linking the input gear with the output gear, whereby the rotation of the input gear corresponds with a greater rotation of the one or more sets of intermediary gears, and the rotation of the one or more sets of intermediary gears corresponds with a greater rotation of the output gear.

6. The driving unit of claim 4 wherein the assembly for tooling comprises an insert that on one end links to the output gear of the planetary gearing, and wherein an opposing end of the insert is configured for being linked to a tool.

7. The driving unit of claim 6 further comprising the tool, wherein the tool is a tapping tool, and the rigid structure is a material for machining by the tapping tool.

8. The driving unit of claim 1 wherein the first portion is an upper portion of the driving unit and the second portion is a lower portion of the driving unit.

9. A driving unit for tooling usable with metal-fabricating presses or other machines comprising:
a first portion and a second portion operably linked to the first portion so as to be movable relative to the first portion, whereby in event of a downward force contacting the first portion and contact being made between the second portion and a rigid structure, upward movement of the second portion results relative to the first portion;
an assembly for tooling;
a gearing configuration operably linked to the assembly for tooling;
a helix drive that operably links the gearing configuration to one of the first portion or the second portion;
whereby in event of the upward movement of the second portion, a corresponding transfer of force results with a rotation of the helix drive;
wherein the helix drive comprises a stem with outer surface defined with a plurality of channels that upwardly curve around and along an extent of the stem; and
wherein the second portion comprises a plurality of bearings each rigidly secured to the second portion, the bearings correspondingly received within the channels of the helix drive stem;
whereby the bearings are directed to move upwardly along the channels of the helix drive stem in event of the upward movement of the second portion relative to the first portion, and corresponds with the rotation of the helix drive stem relative to the second portion and a corresponding rotation of the gearing configuration.

10. The driving unit of claim 9 wherein the stem of the helix drive is situated below the gearing configuration in the driving unit.

11. The driving unit of claim 9 wherein the second portion is defined with a recess sized to receive the helix drive stem, wherein the bearings extend from a corresponding inner surface of the second portion that defines the recess, the bearings spaced about the inner surface and correspondingly extending into the corresponding channels of the helix drive stem.

12. The driving unit of claim 9 whereby in event of the upward movement of the second portion, a corresponding transfer of force results and comprises input linear force being transferred to output rotational force, whereby said transfer of force results from the linkage and corresponding movements of the one of the first portion or the second portion and the helix drive relative to each other.

13. The driving unit of claim 9 wherein the gearing configuration comprises planetary gearing, and wherein an input or ring gear of the planetary gearing is operably linked to the helix drive, whereby the rotation of the helix drive corresponds with a same rotation of the input gear.

14. The driving unit of claim 9 wherein the assembly for tooling is situated below the helix drive.

15. A driving unit for tooling usable with metal-fabricating presses or other machines comprising:
an upper portion and a lower portion operably linked to the upper portion so as to be movable relative to the upper portion, whereby in event of a downward force contacting the upper portion and contact being made between the lower portion and a rigid structure, upward movement of the lower portion results relative to the upper portion;
planetary gearing operably linked to the lower portion;
an assembly for tooling operably linked to the planetary gearing; and
a helix drive that operably links an input or ring gear of the planetary gearing to one of the upper portion or the lower portion;
whereby the upward movement of the lower portion triggers rotation of the input or ring gear of the planetary gearing via linkage with the helix drive;

wherein a rotation of the input or ring gear of the planetary gearing corresponds with a greater rotation of an output or sun gear of the planetary gearing, and wherein the output gear is operably linked to the assembly for tooling, whereby a rotation of the output gear corresponds with a same rotation of the assembly for tooling; and wherein the planetary gearing comprises one or more sets of intermediary or planet gears operably linking the input gear with the output gear, whereby the rotation of the input gear corresponds with a greater rotation of the one or more sets of intermediary gears, and the rotation of the one or more sets of intermediary gears corresponds with a greater rotation of the output gear.

16. The driving unit of claim 15 wherein the helix drive comprises a casing extending from the helix drive, the input gear being internally situated and linked to the casing.

17. The driving unit of claim 15 wherein each set of intermediary gears comprises a quantity of three gears arranged central to and equally spaced about the input gear.

18. The driving unit of claim 15 wherein the one or more sets of intermediary gears are two sets of intermediary gears, a first set of intermediary gears linking the input gear to a second set of intermediary gears, and the second set of intermediary gears linking the first set of intermediary gears to the output gear, whereby a ratio of rotation from the input gear to the output gear is ⅓ of a rotation to 7 rotations.

19. The driving unit of claim 15 whereby in event of the upward movement of the lower portion, a corresponding transfer of force results and comprises input linear force being transferred to output rotational force, whereby said transfer of force results from the linkage and corresponding movements of the lower portion and the helix drive relative to each other.

20. The driving unit of claim 19 wherein the helix drive is rotatable relative to the lower portion, whereby rotation of the helix drive is triggered by the upward movement of the lower portion.

21. The driving unit of claim 15 wherein the assembly for tooling comprises an insert that on one end links to the output gear of the planetary gearing, and wherein an opposing end of the insert is configured for being linked to a tool.

22. The driving unit of claim 21 further comprising the tool, wherein the tool is a tapping tool, and the rigid structure is a material for machining by the tapping tool.

23. The driving unit of claim 15 whereby in event of the upward movement of the second portion, a corresponding transfer of force results and comprises input linear force being transferred to output rotational force, whereby said transfer of force results from the linkage and corresponding movements of the one of the first portion or the second portion and the helix drive relative to each other.

24. The driving unit of claim 15 wherein:
the helix drive comprises a stem with outer surface defined with a plurality of channels that upwardly curve around and along an extent of the stem; and
the second portion comprises a plurality of bearings each rigidly secured to the second portion, the bearings correspondingly received within the channels of the helix drive stem;
whereby the bearings are directed to move upwardly along the channels of the helix drive stem in event of the upward movement of the second portion relative to the first portion, and corresponds with the rotation of the helix drive stem relative to the second portion.

25. The driving unit of claim 15 wherein the assembly for tooling is situated below the helix drive.

26. A tool assembly usable with metal-fabricating presses or other machines comprising:
an upper portion and a lower portion, the upper and lower portions operably coupled;
a head portion operably coupled to the upper portion and configured for contact and downward movement from a machine ram stroke; and
a driving unit comprising a singular helix drive and a transmission assembly operably coupled to the drive, the head portion operably coupled to the helix drive; and
an assembly for tooling operably linked to the transmission assembly;
whereby downward linear movement of the head portion from the machine ram stroke results in rotational movement of the helix drive relative to the head portion, and whereby the rotational movement of the helix drive results in enhanced rotational movement of the transmission assembly, and whereby the enhanced rotational movement of the transmission assembly results in corresponding rotational movement of the assembly for tooling;
wherein the helix drive is rotatable relative to the lower portion, whereby rotation of the helix drive is triggered by the upward movement of the lower portion; and
wherein the assembly for tooling is situated below and in line with the helix drive.

27. The tool assembly of claim 26, wherein the transmission assembly is comprised of planetary gearing.

28. The tool assembly of claim 26, wherein the transmission assembly is a modular unit that is removable from the helix drive.

29. The tool assembly of claim 26, wherein the helix drive is defined with channels that are angled similar to extent of the drive.

30. The tool assembly of claim 29, wherein the head portion is defined with one or more channel sets which cooperate with the helix drive channels so as to increase, decrease, or maintain rotation of the drive.

* * * * *